United States Patent
Shveidel et al.

(10) Patent No.: US 12,298,908 B2
(45) Date of Patent: May 13, 2025

(54) PREFETCHING BY LOGICAL ADDRESS OWNER IN RESPONSE TO PEER NODE MAPPING REQUEST

(71) Applicant: Dell Products L.P., Hopkinton, MA (US)

(72) Inventors: Vladimir Shveidel, Pardes-Hana (IL); Amitai Alkalay, Kadima (IL)

(73) Assignee: Dell Products L.P., Hopkinton, MA (US)

( * ) Notice: Subject to any disclaimer, the term of this patent is extended or adjusted under 35 U.S.C. 154(b) by 62 days.

(21) Appl. No.: 18/207,364

(22) Filed: Jun. 8, 2023

(65) Prior Publication Data
US 2024/0411696 A1    Dec. 12, 2024

(51) Int. Cl.
*G06F 12/0862* (2016.01)
*G06F 12/1009* (2016.01)

(52) U.S. Cl.
CPC ...... *G06F 12/0862* (2013.01); *G06F 12/1009* (2013.01)

(58) Field of Classification Search
CPC .......................... G06F 12/0862; G06F 12/1009
See application file for complete search history.

(56) References Cited

U.S. PATENT DOCUMENTS

| | | | | |
|---|---|---|---|---|
| 2010/0088335 | A1* | 4/2010 | Mimatsu | H04L 67/1097 707/E17.032 |
| 2013/0097402 | A1* | 4/2013 | Bao | G06F 12/0215 711/205 |
| 2017/0353576 | A1* | 12/2017 | Guim Bernat | G06F 12/0862 |
| 2021/0064581 | A1* | 3/2021 | Wang | G06F 16/1752 |

OTHER PUBLICATIONS

U.S. Appl. No. 18/160,404, filed Jan. 27, 2023, entitled System and Method for Managing Data Portion Ownership in a Storage Cluster, to Vladimir Shveidel, et al.

* cited by examiner

Primary Examiner — Mark A Giardino, Jr.
(74) Attorney, Agent, or Firm — Muirhead and Saturnelli, LLC

(57) ABSTRACT

In one embodiment, processing can include: receiving, at a first node, a read I/O to read content C1 of logical address LA, wherein the first node does not own LA; and responsive to determining a hash table of the first node does not include a matching entry for LA, performing processing including: sending a request from the first node to a second node that owns LA; sending, to the first node, a response including an address hint for LA and additional address hints for logical addresses, wherein LA and the additional address hints are included in a logical address subrange associated with a single metadata page used in mapping LA and the logical addresses to physical storage locations that store content of LA and the logical addresses; the first node adding entries to the hash table for the additional address hints; and obtaining C1 using the address hint for LA.

20 Claims, 17 Drawing Sheets

PREFETCHING BY LOGICAL ADDRESS OWNER IN RESPONSE TO PEER NODE MAPPING REQUEST

BACKGROUND

Systems include different resources used by one or more host processors. The resources and the host processors in the system are interconnected by one or more communication connections, such as network connections. These resources include data storage devices such as those included in data storage systems. The data storage systems are typically coupled to one or more host processors and provide storage services to each host processor. Multiple data storage systems from one or more different vendors can be connected to provide common data storage for the one or more host processors.

A host performs a variety of data processing tasks and operations using the data storage system. For example, a host issues I/O operations, such as data read and write operations, that are subsequently received at a data storage system. The host systems store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device is provided from the data storage system to the host systems also through the channels. The host systems do not address the storage devices of the data storage system directly, but rather, access what appears to the host systems as a plurality of files, objects, logical units, logical devices or logical volumes. Thus, the I/O operations issued by the host are directed to a particular storage entity, such as a file or logical device. The logical devices generally include physical storage provisioned from portions of one or more physical drives. Allowing multiple host systems to access the single data storage system allows the host systems to share data stored therein.

SUMMARY OF THE PRESENT DISCLOSURE

Various embodiments of the techniques herein can include a computer-implemented method, a system and a non-transitory computer readable medium. The system can include one or more processors, and a memory comprising code that, when executed, performs the method. The non-transitory computer readable medium can include code stored thereon that, when executed, performs the method. The method can comprise: receiving, at a first node of a system, a read I/O to read content C1 stored at a target logical address LA, wherein the first node does not own LA and wherein a second node of the system owns LA; determining whether a first hash table of the first node includes a first matching entry for LA; and responsive to determining the first hash table of the first node does not include the first matching entry for LA, performing first processing including: sending a first request from the first node to the second node that owns LA, wherein the first request requests the second node to perform resolution processing for LA; responsive to receiving the first request, the second node sending a first response to the first node, the first response including a first address hint corresponding to LA, and wherein the first response includes one or more additional address hints corresponding to one or more logical addresses, wherein LA and the one or more additional address hints are included in a first logical address subrange associated with a single metadata (MD) page used in mapping LA and the one or more logical addresses to corresponding physical storage locations that store content of LA and the one or more logical addresses; responsive to the first node receiving the first response, the first node adding one or more entries to the first hash table for the one or more additional address hints that are included in the first response and that correspond to the one or more logical addresses; and obtaining, by the first node using the first address hint of the first response, C1 from a first physical storage location.

In at least one embodiment, the first processing can include the first node returning C1 as obtained from the first physical storage location using the first address hint of the response. The first hash table can be a prefetch hash table of entries for logical addresses not owned by the first node. Each entry of the first hash table can include a prefetched address hint and a corresponding logical address. The prefetched address hint can be used to access current content of the corresponding logical address and the current content can be stored at a physical location storage location on backend non-volatile storage.

In at least one embodiment, processing can include responsive to determining the first hash table of the first node includes the first matching entry for LA, the first node performing second processing, wherein the first matching entry for LA can include the first address hint for LA, and wherein the second processing can include the first node using the first address hint to read C1 from the first physical storage location on backend non-volatile storage. The second processing can include the first node returning C1 as read from the first physical location in response to the read I/O.

In at least one embodiment, the first address hint and the one or more additional address hints can be indirect pointers used to obtain corresponding content of corresponding logical addresses from corresponding physical storage locations. First mapping information can be used in mapping the LA to the first physical storage location storing C1, and wherein the first mapping information can include a MD top object, a MD mid object and a MD leaf object associated with LA. Each of the indirect pointers associated with a corresponding logical address can be an address of, or pointer to, a virtual layer block (VLB) entry. The VLB entry can include an address of, or pointer to, a corresponding physical storage location of content stored at the corresponding logical address. LA and the one or more logical addresses can be included in a logical address range R1 associated with the MD leaf object. LA and the one or more logical addresses can form a consecutive sequential logical address subrange. Each of the one or more logical addresses can be subsequent to LA in the consecutive sequential logical address subrange.

In at least one embodiment, the first address hint and the one or more additional address hints can be first addresses or pointers used to obtain corresponding content of corresponding logical addresses from corresponding physical storage locations. First mapping information can be used in mapping the LA to the first physical storage location storing C1, and wherein the first mapping information can include a MD top object, a MD mid object and a MD leaf object associated with LA. Each of the first addresses or pointers associated with a corresponding logical address can be an address of, or pointer to, a corresponding physical storage location of content stored at the corresponding logical address. LA and the one or more logical addresses can be included in a logical address range R1 associated with the MD leaf object.

In at least one embodiment, processing can include: receiving, by the second node that owns LA, a write I/O that writes second content C2 to LA; responsive to the second node receiving the write I/O directed to LA, sending a notification to the first node that does not own LA; responsive to the first node receiving the notification, the first node removing any corresponding entry from the first hash table that matches LA; and recording the write I/O in a log file.

In at least one embodiment, processing can include: receiving, by the first node that does not own LA, a write I/O that writes second content C2 to LA; responsive to the first node receiving the write I/O directed to LA, the first node removing any corresponding entry from the first hash table that matches LA; and recording the write I/O in a log file.

In at least one embodiment, the LA and the one or more logical addresses can be owned by the second node, and wherein the second node can own all logical addresses associated with the single MD page.

BRIEF DESCRIPTION OF THE DRAWINGS

Features and advantages of the present disclosure will become more apparent from the following detailed description of exemplary embodiments thereof taken in conjunction with the accompanying drawings in which.

DETAILED DESCRIPTION OF EMBODIMENT(S)

Figure 1:
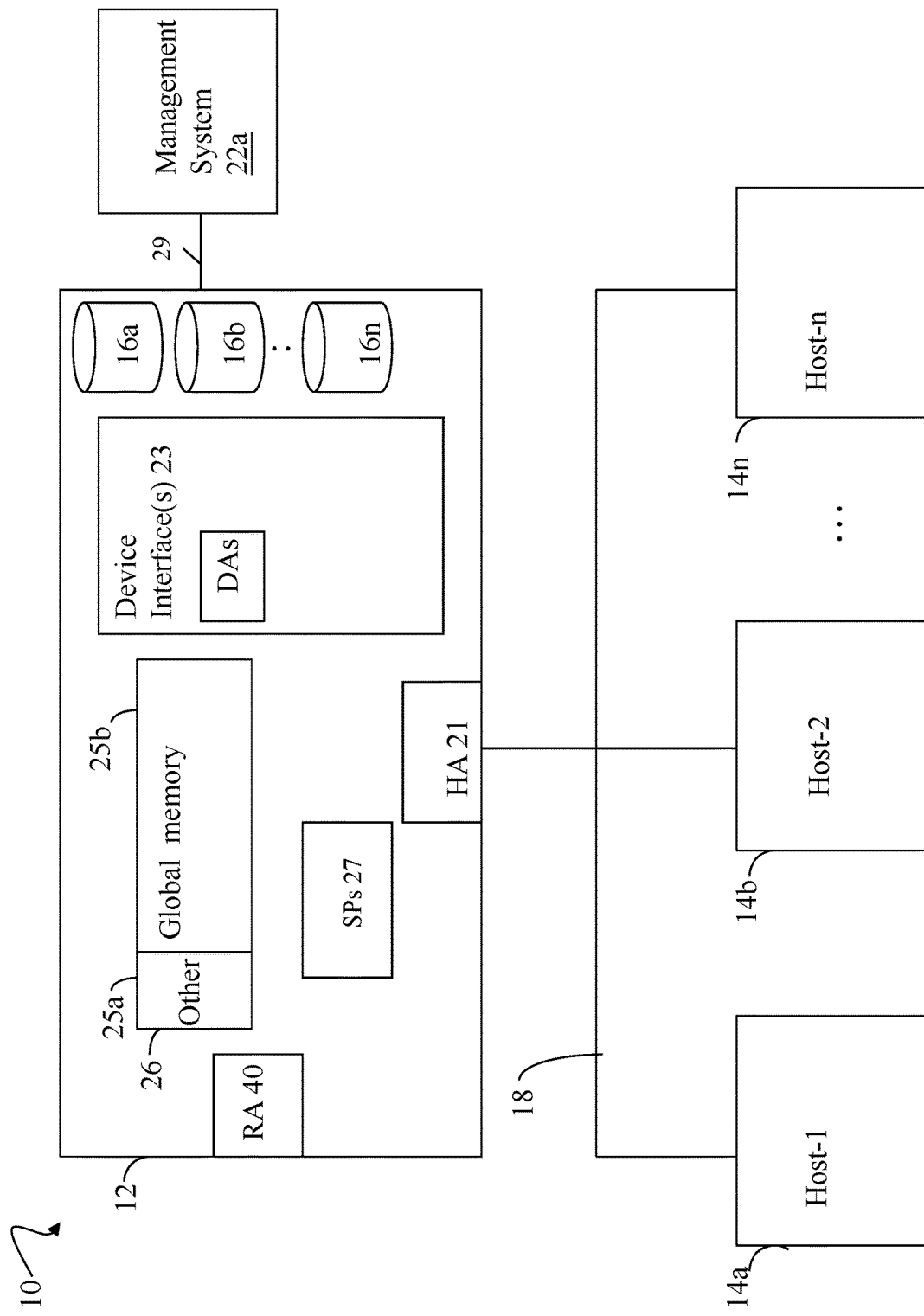
FIG. 1 is an example of components that may be included in a system in accordance with the techniques of the present disclosure.

Existing systems, such as data storage systems, can maintain and utilize a data cache to store frequently accessed pages of content or data such as user data of storage system clients. The data cache can be, for example, a form of fast volatile memory such as a volatile form of random access memory (RAM). In particular, the data cache can be used as a read data cache to store user data which is frequently read. For a read I/O requesting read data, the read data which is stored in the cache results in a cache hit or read cache hit. For a read cache hit, the requested read data can be retrieved from the cache and returned to the requester or originator of the read I/O. If the requested read data is not in the cache, a cache miss or read cache miss results where the requested read data can be retrieved from longer term backend (BE) non-volatile storage. A cache miss as compared to a cache hit results in an I/O performance penalty and increased I/O latency in order to service the read I/O and return the requested read data to the requester. The data cache can provide for read cache hits and optimized performance such as by providing for improved I/O latency and improved utilization of system resources. Generally, the data cache, and cache memory in general, can be characterized as a critical and expensive resource which can have a limited size or capacity. Accordingly, it is important for systems to utilize the data cache, and more generally cache storage, efficiently to provide for optimal performance.

In at least one existing system, mapping information can be used to map a logical address to a corresponding physical storage location or address storing the user data or content of the logical address. The mapping information can be a chain of metadata (MD) pages traversed to obtain the content of a logical address from its corresponding physical storage location or address on BE non-volatile storage. Thus, a read cache miss with respect to a read I/O requesting to read user data from a logical address can result in a cache miss with respect to the data cache noted above. Read cache miss processing can incur a performance penalty as noted above, at least in part, due to the traversal of the chain of MD pages of the mapping information. The MD pages of mapping information can also be stored on BE non-volatile storage. Thus, traversing the chain of MD page can include retrieving each MD page of the chain from BE non-volatile storage thereby incurring additional performance penalties to access. To further improve performance, a system can also store the mapping information, such as the chain of MD pages, in the cache. However, as with the user data and the limited size of the cache, not all mapping information or MD pages for all user data can be stored in the cache. As a result, accessing the multiple layers or levels of MD pages which can be needed for accessing the read data to service a read cache miss can result in additional cache misses thereby incurring an additional performance penalty to access any uncached MD pages of mapping information from BE non-volatile storage.

Some system can include multiple processing nodes where the multiple processing nodes can service I/Os. In such systems, cache usage can be even more inefficient across the multiple processing nodes since the same MD and/or user data or content for servicing I/Os can be cached in node-local caches of all the multiple processing nodes. For example, pages of the same user data and/or MD can be cached locally in caches of the multiple processing nodes. Additionally, due to the shared access of user data and MD among the multiple processing nodes, a synchronization or control mechanism can be used to coordinate access of the shared used data and MD among the nodes. For example, a locking technique can be used synchronize or generally coordinate access among the shared data and MD among the nodes. As another example, a technique can be used which provides a strong separation of responsibilities between the nodes in connection with the shared data and MD.

To improve upon the foregoing, an architecture can be utilized which partitions ownership of the logical address space of user data or content among the multiple processing nodes. In one such architecture, a node assigned a particular logical address can be designated as the owner of the logical address. In at least one system including multiple processing nodes, an I/O directed to a logical address can be received by either the owning node or a non-owning node.

If a node receives a read I/O directed to a logical address LA1 not owned by the receiving node, the receiving node can issue a request to its peer node that owns LA1 to perform processing on behalf of the receiving node. The request can be a request for the owner node of LA1 to perform resolution processing (sometimes referred to as address resolution processing) using mapping information of MD pages for LA1. In response, the owner node of LA1 can return an address hint, or more generally, a hint used to access content C1 of LA1 as stored on BE non-volatile storage. In some embodiments, the hint can be an address or pointer used to access a physical storage location of C1 on BE non-volatile storage.

One challenge of such an architecture where I/Os directed to LA1 can be received by both owner and non-owner nodes is that it can be expected that generally about 50% of such I/Os directed to LA1 can be received by the non-owning node. For I/Os such as read I/Os directed to LA1 that are received by the non-owner node, an additional read I/O latency performance penalty is incurred since the receiving non-owner node can issue the above-noted request for resolution processing to the owner peer node. The address resolution processing as described above involves additional time and resources incurred in sending the request from the receiving non-owner node to the owner node of LA1, and receiving a response at the receiving node from the owner node. Assuming that approximately 50% of I/Os are handled by a non-owning node, the foregoing can generally result in incurring undesirable performance penalties such as in connection with read I/Os directed to logical addresses where such read I/Os are received at a node that does not own the logical addresses.

The above-noted adverse performance impact of the round trip additional time incurred due to the request and response exchange between nodes can be particularly noticeable in connection with consecutive sequential read I/Os directed to consecutive sequential logical addresses thereby forming a sequential read pattern. In connection with a sequential read I/O pattern, the needed corresponding MD can be stored in the cache of the owner node after a first read I/O of the pattern. Subsequent reads to consecutive sequential logical addresses can generally be expected to use the same MD that may have been brought into cache as a result of the first read I/O of the pattern. Thus, such subsequent reads can be expected to have lower latency than, for example, the first read I/O of the pattern. In this case, the additional overhead incurred as a result of the above-noted round trip time when such subsequent sequential read I/Os are received by a non-owner node can comprise a majority of the end to end I/O latency.

Accordingly, described in the present disclosure are techniques that overcome the foregoing drawbacks and provide for reduced read I/O latency such as in connection with consecutive sequential read I/O patterns. In at least one embodiment, the techniques of the present disclosure can provide for data consistency and also provide for improvements in I/O performance in connection with consecutive read I/Os directed to sequential logical addresses where such logical addresses are not owned by the receiving node.

In at least one embodiment, an architecture can be utilized which partitions ownership of a logical address space of user data or content among the multiple processing nodes of the storage system. For example, the logical address space can correspond to one or more volumes, or more generally, one or more storage objects. The storage objects can include logical devices or volumes, files, file systems, directories, and/or sub-portions of such storage objects.

In at least one embodiment, a node assigned a particular logical address, or a subrange of logical addresses, can be designated as the sole owner, respectively, of the logical address or subrange. In at least one embodiment, a node which owns the logical address can perform address resolution processing (sometimes referred to herein as simply resolution processing) for the logical address using the mapping information of MD pages and can traverse a portion, or at least some, of the chain of MD pages to obtain an IDP (indirect pointer) to the requested read data.

In at least one embodiment, the logical address space can be partitioned or divided into slices where each slice corresponds to a sub-volume logical address portion. In this manner, a volume or logical device, or more generally a storage object, can have an associated logical address space which is partitioned into multiple slices. Each such slice can be assigned to a single one of the nodes as the slice's owner.

In at least one embodiment, when a read I/O directed to the logical address LA is received by the non-owner node that does not own LA, the non-owner node can issue a remote procedure call (RPC) to the owner node to perform processing including any needed resolution processing using mapping information of MD pages associated with the LA. A node receiving an I/O operation such as the read I/O can sometimes be referred to as an initiator node. In at least one embodiment, when an initiator node receives the read I/O directed to LA not owned by the initiator node, the initiator node can send a request, such as an RPC, to the owning peer node to perform address resolution processing for LA. The peer node which owns LA can perform address resolution processing using the corresponding mapping information for LA. The address resolution processing performed by the owning node can include the owning node using the mapping information of MD pages and traversing a portion or at least some of the chain of MD pages to obtain an IDP to the requested read data of LA. The owning node can return and RPC response that includes the IDP of the read data to the non-owner initiator node. In turn, the non-owner initiator node can use the IDP to: obtain the requested read data of LA from BE non-volatile storage, and return the read data in response to the received read I/O.

In at least one embodiment, the RPC response returned from the owner node of LA to the non-owner initiator node can additionally include one or more additional IDPs corresponding to one or more additional logical addresses. In at least one embodiment, the logical address LA in combination with the one or more additional logical addresses can form a sequential logical address subrange SUB1. In at least one embodiment, all logical addresses of SUB1 can fall within a defined logical address range R1 that maps to a single corresponding MD leaf. More generally in at least one embodiment, the IDPs or other hints returned in the response can correspond to logical addresses included in R1 of the same MD leaf in order to avoid an additional runtime penalty of accessing an additional MD leaf. Thus, in at least one embodiment, the mapping of one or more IDPs for the one or more additional logical addresses may be obtained without incurring excessive additional processing costs since the same chain of MD pages including the same MD leaf corresponding to LA can generally be used to obtain all the IDPs of R1 of the same MD leaf.

In at least one embodiment, the non-owner initiator node of LA receiving the response can maintain a prefetch hash table (PHT) used to cache or store the one or more additional IDPs of the response corresponding, respectively, to one or more additional LAs of SUB1, or more generally R1 of a single MD leaf page. The PHT can be accessed, indexed or queried using a logical address to obtain a corresponding IDP, if any, is stored in the PHT of the node. Generally in at least one embodiment, each node can maintain a node-local PHT used by that node to store prefetched additional mappings of logical addresses to corresponding IDPs where such logical addresses mapped by the PHT of the node are not owned by the node.

In at least one embodiment, coherency of PHTs on nodes can be maintained by providing notification to a non-owner of LA when a write I/O writing or updating LA is received by the owner node. In at least one embodiment, in response to the non-owner of LA receiving the notification from the owner node regarding the modification or writing to LA, the non-owner node of LA can invalidate or remove a corresponding entry (if any) for LA from the non-owner node's PHT. In response to a non-owner node of LA receiving a write to LA, the non-owner node can invalidate or remove a corresponding entry (if any) for LA from the initiator non-owner node's PHT.

In at least one embodiment, when a read I/O directed to LA is received by a node that does not own LA, the receiving initiator node can first query its local PHT to determine whether there is a corresponding entry in the initiator node's PHT for LA. If there is such an entry in the PHT of the non-owner initiator node for LA, the PHT entry can map LA to a corresponding IDP. In this manner, if there is a PHT entry in the initiator node's PHT for LA, the initiator node can used the corresponding IDP of the matching PHT entry to read content C1 stored at LA from BE non-volatile storage, and then return C1 in response to the read I/O. If there is no such PHT entry for LA in the initiator node's PHT, then the initiator node can issue a request to the owner peer node to perform resolution processing for LA. The peer node that owns LA can return a response to the initiator node, where the response can include the IDP for LA along with one or more additional IDPs associated with one or more corresponding logical addresses (LAs). The LA and one or more corresponding LAs can be included in SUB1 denoting the same consecutive sequential address subrange. More generally in at least one embodiment, the response can return the IDP for LA and one or more additional IDPs for one or more additional LAs included in R1, where R1 denotes a logical address range associated with a single MD leaf. The non-owner initiator node can store, in its PHT, one or more PHT entries for the one or more additional IDPs for one or more additional LAs returned in the response, where each such of the one or more PHT entries can map one of the additional LAs to a corresponding one of the additional IDPs of the response.

In at least one embodiment, the mapping information can include a multi-level tree or hierarchical structure of MD pages. In at least one embodiment, the number of levels in the tree or structure can be three or more. In at least one embodiment, the tree can be a B+ tree data structure where each non-leaf node can include up to N children. Thus N can be a specified maximum allowable number of child nodes and N can be 2 or more.

In at least one embodiment in which the mapping information includes a 3 level tree of MD pages, each slice, which is owned by one of the nodes, can correspond to a logical address space subrange associated with a MD leaf page of the tree. The tree can also include a mid MD page level of mid MD pages and a top MD page level of top MD pages. Each mid MD page can include addresses of, or pointers to, MD leaf pages. Each top MD page can include addresses of, or pointers to, MD mid pages.

In at least one embodiment, the storage system can include two nodes and a logical address space can be partitioned into two sets of slices, where each slice set is owned by only a single one of the nodes. The logical address space can be partitioned into consecutive slices which correspond to consecutive, contiguous sequential logical address subranges of the logical address space. The slices can be assigned a unique integer identifier or ID such as beginning with one (1), where even slices can be included a first slice set owned by node A, and where odd slices can be included in a second slice set owned by node B. Each slice can correspond to a logical address subrange size such as 2 MBs. In at least one embodiment, each MD page of the tree of mapping information can include 512 entries, where each entry is a pointer or address. Each non-leaf MD page entry can be a pointer to, or address of, another MD page. Each leaf MD page entry can be a pointer to, or address of, an entry in a VLB (virtual layer block) page. In such an embodiment where each MD leaf corresponds to a 2 MB logical address space portion, each MD leaf entry can correspond to a 4K page of content or stored user data. Each MD leaf entry can include the address of a VLB entry, where the VLB entry further includes another pointer to or address of non-volatile storage containing the content or user data.

The foregoing and other aspects of the techniques of the present disclosure are described in more detail in the following paragraphs.

Referring to the FIG. 1, shown is an example of an embodiment of a SAN 10 that is used in connection with performing the techniques described herein. The SAN 10 includes a data storage system 12 connected to the host systems (also sometimes referred to as hosts) 14a-14n through the communication medium 18. In this embodiment of the SAN 10, the n hosts 14a-14n access the data storage system 12, for example, in performing input/output (I/O) operations or data requests. The communication medium 18 can be any one or more of a variety of networks or other type of communication connections as known to those skilled in the art. The communication medium 18 can be a network connection, bus, and/or other type of data link, such as a hardwire or other connections known in the art. For example, the communication medium 18 can be the Internet, an intranet, a network, or other wireless or other hardwired connection(s) by which the host systems 14a-14n access and communicate with the data storage system 12, and also communicate with other components included in the SAN 10.

Each of the host systems 14a-14n and the data storage system 12 included in the SAN 10 are connected to the communication medium 18 by any one of a variety of connections as provided and supported in accordance with the type of communication medium 18. The processors included in the host systems 14a-14n and data storage system 12 can be any one of a variety of proprietary or commercially available single or multi-processor system, such as an Intel-based processor, or other type of commercially available processor able to support traffic in accordance with each particular embodiment and application.

It should be noted that the particular examples of the hardware and software included in the data storage system 12 are described herein in more detail, and can vary with each particular embodiment. Each of the hosts 14a-14n and the data storage system 12 can all be located at the same physical site, or, alternatively, be located in different physical locations. The communication medium 18 used for communication between the host systems 14a-14n and the data storage system 12 of the SAN 10 can use a variety of different communication protocols such as block-based protocols (e.g., SCSI, FC, iSCSI), file system-based protocols (e.g., NFS or network file server), and the like. Some or all of the connections by which the hosts 14a-14n and the data storage system 12 are connected to the communication medium 18 can pass through other communication devices, such as switching equipment, a phone line, a repeater, a multiplexer or even a satellite.

Each of the host systems 14a-14n can perform data operations. In the embodiment of the FIG. 1, any one of the host computers 14a-14n issues a data request to the data storage system 12 to perform a data operation. For example, an application executing on one of the host computers 14a-14n performs a read or write operation resulting in one or more data requests to the data storage system 12.

It should be noted that although the element 12 is illustrated as a single data storage system, such as a single data storage array, the element 12 also represents, for example, multiple data storage arrays alone, or in combination with, other data storage devices, systems, appliances, and/or components having suitable connectivity to the SAN 10 in an embodiment using the techniques herein. It should also be noted that an embodiment can include data storage arrays or other components from one or more vendors. In subsequent examples illustrating the techniques herein, reference is made to a single data storage array by a vendor. However, as will be appreciated by those skilled in the art, the techniques herein are applicable for use with other data storage arrays by other vendors and with other components than as described herein for purposes of example.

In at least one embodiment, the data storage system 12 is a data storage appliance or a data storage array including a plurality of data storage devices (PDs) 16a-16n. The data storage devices 16a-16n include one or more types of data storage devices such as, for example, one or more rotating disk drives and/or one or more solid state drives (SSDs). An SSD is a data storage device that uses solid-state memory to store persistent data. SSDs refer to solid state electronics devices as distinguished from electromechanical devices, such as hard drives, having moving parts. Flash devices or flash memory-based SSDs are one type of SSD that contains no moving mechanical parts. In at least one embodiment, the flash devices can be constructed using nonvolatile semiconductor NAND flash memory. The flash devices include, for example, one or more SLC (single level cell) devices and/or MLC (multi level cell) devices.

In at least one embodiment, the data storage system or array includes different types of controllers, adapters or directors, such as an HA 21 (host adapter), RA 40 (remote adapter), and/or device interface(s) 23. Each of the adapters (sometimes also known as controllers, directors or interface components) can be implemented using hardware including a processor with a local memory with code stored thereon for execution in connection with performing different operations. The HAs are used to manage communications and data operations between one or more host systems and the global memory (GM). In an embodiment, the HA is a Fibre Channel Adapter (FA) or other adapter which facilitates host communication. The HA 21 can be characterized as a front end component of the data storage system which receives a request from one of the hosts 14a-n. In at least one embodiment, the data storage array or system includes one or more RAs used, for example, to facilitate communications between data storage arrays. The data storage array also includes one or more device interfaces 23 for facilitating data transfers to/from the data storage devices 16a-16n. The data storage device interfaces 23 include device interface modules, for example, one or more disk adapters (DAs) (e.g., disk controllers) for interfacing with the flash drives or other physical storage devices (e.g., PDS 16a-n). The DAs can also be characterized as back end components of the data storage system which interface with the physical data storage devices.

One or more internal logical communication paths exist between the device interfaces 23, the RAs 40, the HAs 21, and the memory 26. An embodiment, for example, uses one or more internal busses and/or communication modules. In at least one embodiment, the global memory portion 25b is used to facilitate data transfers and other communications between the device interfaces, the HAs and/or the RAs in a data storage array. In one embodiment, the device interfaces 23 performs data operations using a system cache included in the global memory 25b, for example, when communicating with other device interfaces and other components of the data storage array. The other portion 25a is that portion of the memory used in connection with other designations that can vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, can also be included in an embodiment.

The host systems 14a-14n provide data and access control information through channels to the storage systems 12, and the storage systems 12 also provide data to the host systems 14a-n also through the channels. The host systems 14a-n do not address the drives or devices 16a-16n of the storage systems directly, but rather access to data is provided to one or more host systems from what the host systems view as a plurality of logical devices, logical volumes (LVs) also referred to herein as logical units (e.g., LUNs). A logical unit (LUN) can be characterized as a disk array or data storage system reference to an amount of storage space that has been formatted and allocated for use to one or more hosts. A logical unit has a logical unit number that is an I/O address for the logical unit. As used herein, a LUN or LUNs refers to the different logical units of storage referenced by such logical unit numbers. The LUNs have storage provisioned from portions of one or more physical disk drives or more generally physical storage devices. For example, one or more LUNs can reside on a single physical disk drive, data of a single LUN can reside on multiple different physical devices, and the like. Data in a single data storage system, such as a single data storage array, can be accessible to multiple hosts allowing the hosts to share the data residing therein. The HAs are used in connection with communications between a data storage array and a host system. The RAs are used in facilitating communications between two data storage arrays. The DAs include one or more types of device interfaced used in connection with facilitating data transfers to/from the associated disk drive(s) and LUN (s) residing thereon. For example, such device interfaces can include a device interface used in connection with facilitating data transfers to/from the associated flash devices and LUN(s) residing thereon. It should be noted that an embodiment can use the same or a different device interface for one or more different types of devices than as described herein.

In an embodiment in accordance with the techniques herein, the data storage system as described can be characterized as having one or more logical mapping layers in which a logical device of the data storage system is exposed to the host whereby the logical device is mapped by such mapping layers of the data storage system to one or more physical devices. Additionally, the host can also have one or more additional mapping layers so that, for example, a host side logical device or volume is mapped to one or more data storage system logical devices as presented to the host.

It should be noted that although examples of the techniques herein are made with respect to a physical data storage system and its physical components (e.g., physical hardware for each HA, DA, HA port and the like), the techniques herein can be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22a used to manage and monitor the data storage system 12. In one embodiment, the management system 22a is a computer system which includes data storage system management software or application that executes in a web browser. A data storage system manager can, for example, view information about a current data storage configuration such as LUNs, storage pools, and the like, on a user interface (UI) in a display device of the management system 22a. Alternatively, and more generally, the management software can execute on any suitable processor in any suitable system. For example, the data storage system management software can execute on a processor of the data storage system 12.

Information regarding the data storage system configuration is stored in any suitable data container, such as a database. The data storage system configuration information stored in the database generally describes the various physical and logical entities in the current data storage system configuration. The data storage system configuration information describes, for example, the LUNs configured in the system, properties and status information of the configured LUNs (e.g., LUN storage capacity, unused or available storage capacity of a LUN, consumed or used capacity of a LUN), configured RAID groups, properties and status information of the configured RAID groups (e.g., the RAID level of a RAID group, the particular PDs that are members of the configured RAID group), the PDs in the system, properties and status information about the PDs in the system, data storage system performance information such as regarding various storage objects and other entities in the system, and the like.

Consistent with other discussion herein, management commands issued over the control or management path include commands that query or read selected portions of the data storage system configuration, such as information regarding the properties or attributes of one or more LUNs. The management commands also include commands that write, update, or modify the data storage system configuration, such as, for example, to create or provision a new LUN (e.g., which result in modifying one or more database tables such as to add information for the new LUN), and the like.

It should be noted that each of the different controllers or adapters, such as each HA, DA, RA, and the like, can be implemented as a hardware component including, for example, one or more processors, one or more forms of memory, and the like. Code can be stored in one or more of the memories of the component for performing processing.

The device interface, such as a DA, performs I/O operations on a physical device or drive 16a-16n. In the following description, data residing on a LUN is accessed by the device interface following a data request in connection with I/O operations. For example, a host issues an I/O operation that is received by the HA 21. The I/O operation identifies a target location from which data is read from, or written to, depending on whether the I/O operation is, respectively, a read or a write operation request. In at least one embodiment using block storage services, the target location of the received I/O operation is expressed in terms of a LUN and logical address or offset location (e.g., LBA or logical block address) on the LUN. Processing is performed on the data storage system to further map the target location of the received I/O operation, expressed in terms of a LUN and logical address or offset location on the LUN, to its corresponding physical storage device (PD) and location on the PD. The DA which services the particular PD performs processing to either read data from, or write data to, the corresponding physical device location for the I/O operation.

It should be noted that an embodiment of a data storage system can include components having different names from that described herein but which perform functions similar to components as described herein. Additionally, components within a single data storage system, and also between data storage systems, can communicate using any suitable technique described herein for exemplary purposes. For example, the element 12 of the FIG. 1 in one embodiment is a data storage system, such as a data storage array, that includes multiple storage processors (SPs). Each of the SPs 27 is a CPU including one or more "cores" or processors and each have their own memory used for communication between the different front end and back end components rather than utilize a global memory accessible to all storage processors. In such embodiments, the memory 26 represents memory of each such storage processor.

Generally, the techniques herein can be used in connection with any suitable storage system, appliance, device, and the like, in which data is stored. For example, an embodiment can implement the techniques herein using a midrange data storage system as well as a higher end or enterprise data storage system.

The data path or I/O path can be characterized as the path or flow of I/O data through a system. For example, the data or I/O path can be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receive a response (possibly including requested data) in connection such I/O commands.

The control path, also sometimes referred to as the management path, can be characterized as the path or flow of data management or control commands through a system. For example, the control or management path is the logical flow through hardware and software components or layers in connection with issuing data storage management command to and/or from a data storage system, and also receiving responses (possibly including requested data) to such control or management commands. For example, with reference to the FIG. 1, the control commands are issued from data storage management software executing on the management system 22a to the data storage system 12. Such commands, for example, establish or modify data services, provision storage, perform user account management, and the like. Consistent with other discussion herein, management commands result in processing that can include reading and/or modifying information in the database storing data storage system configuration information.

The data path and control path define two sets of different logical flow paths. In at least some of the data storage system configurations, at least part of the hardware and network connections used for each of the data path and control path differ. For example, although both control path and data path generally use a network for communications, some of the hardware and software used can differ. For example, with reference to the FIG. 1, a data storage system has a separate physical connection 29 from a management system 22a to the data storage system 12 being managed whereby control commands are issued over such a physical connection 29. However, user I/O commands are never issued over such a physical connection 29 provided solely for purposes of connecting the management system to the data storage system. In any case, the data path and control path each define two separate logical flow paths.

Figure 2A:
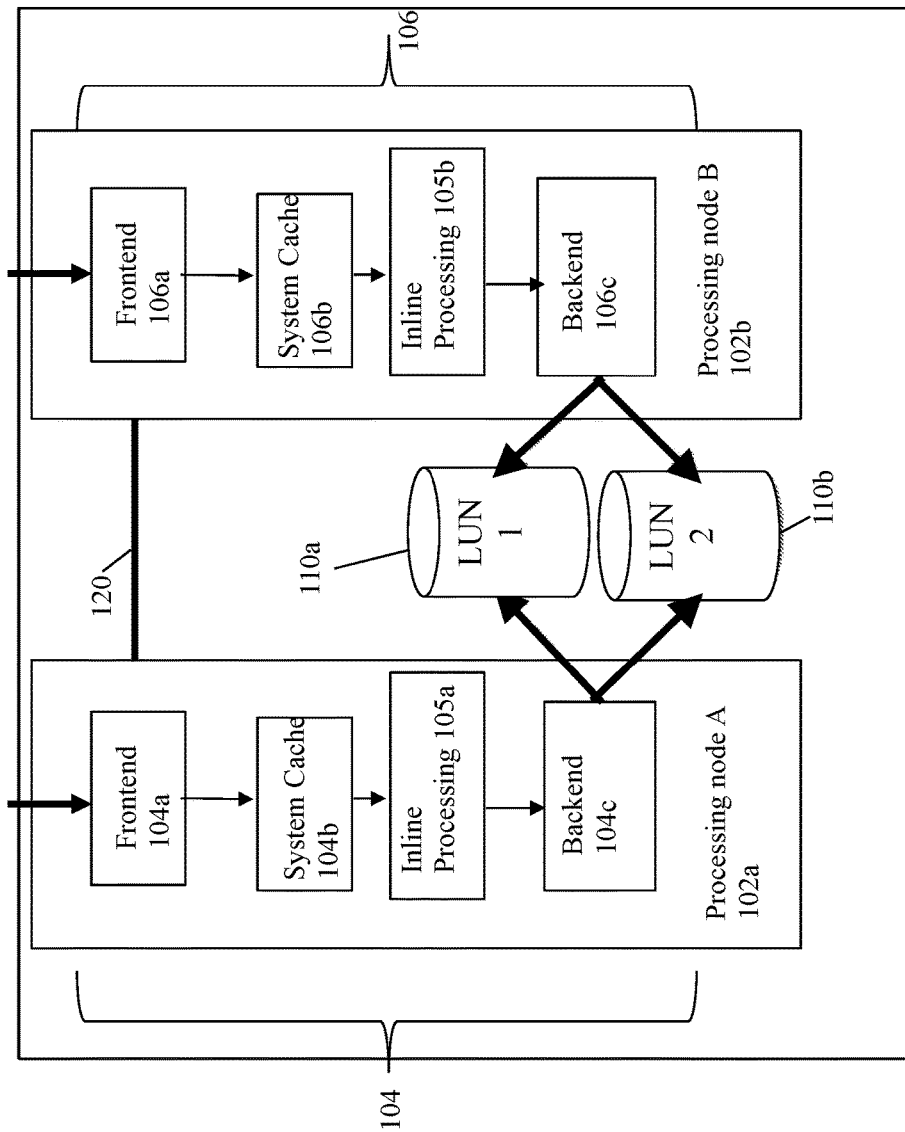
FIG. 2A is an example illustrating the I/O path or data path in connection with processing data in at least one embodiment in accordance with the techniques of the present disclosure.

With reference to the FIG. 2A, shown is an example 100 illustrating components that can be included in the data path in at least one existing data storage system in accordance with the techniques of the present disclosure. The example 100 includes two processing nodes A 102a and B 102b and the associated software stacks 104, 106 of the data path, where I/O requests can be received by either processing node 102a or 102b. In the example 200, the data path 104 of processing node A 102a includes: the frontend (FE) component 104a (e.g., an FA or front end adapter) that translates the protocol-specific request into a storage system-specific request; a system cache layer 104b where data is temporarily stored; an inline processing layer 105a; and a backend (BE) component 104c that facilitates movement of the data between the system cache and non-volatile physical storage (e.g., back end physical non-volatile storage devices or PDs accessed by BE components such as DAs as described herein). During movement of data in and out of the system cache layer 104b (e.g., such as in connection with read data from, and writing data to, physical storage 110a, 110b), inline processing can be performed by layer 105a. Such inline processing operations of 105a can be optionally performed and can include any one of more data processing operations in connection with data that is flushed from system cache layer 104b to the back-end non-volatile physical storage 110a, 110b, as well as when retrieving data from the back-end non-volatile physical storage 110a, 110b to be stored in the system cache layer 104b. In at least one embodiment, the inline processing can include, for example, performing one or more data reduction operations such as data deduplication or data compression. The inline processing can include performing any suitable or desirable data processing operations as part of the I/O or data path.

In a manner similar to that as described for data path 104, the data path 106 for processing node B 102b has its own FE component 106a, system cache layer 106b, inline processing layer 105b, and BE component 106c that are respectively similar to the components 104a, 104b, 105a and 104c. The elements 110a, 110b denote the non-volatile BE physical storage provisioned from PDs for the LUNs, whereby an I/O can be directed to a location or logical address of a LUN and where data can be read from, or written to, the logical address. The LUNs 110a, 110b are examples of storage objects representing logical storage entities included in an existing data storage system configuration. Since, in this example, writes, or more generally I/Os, directed to the LUNs 110a, 110b can be received for processing by either of the nodes 102a and 102b, the example 100 illustrates what can also be referred to as an active-active configuration.

In connection with a write operation received from a host and processed by the processing node A 102a, the write data can be written to the system cache 104b, marked as write pending (WP) denoting it needs to be written to the physical storage 110a, 110b and, at a later point in time, the write data can be destaged or flushed from the system cache to the physical storage 110a, 110b by the BE component 104c. The write request can be considered complete once the write data has been stored in the system cache whereby an acknowledgement regarding the completion can be returned to the host (e.g., by component the 104a). At various points in time, the WP data stored in the system cache is flushed or written out to the physical storage 110a, 110b.

In connection with the inline processing layer 105a, prior to storing the original data on the physical storage 110a, 110b, one or more data reduction operations can be performed. For example, the inline processing can include performing data compression processing, data deduplication processing, and the like, that can convert the original data (as stored in the system cache prior to inline processing) to a resulting representation or form which is then written to the physical storage 110a, 110b.

In connection with a read operation to read a block of data, a determination is made as to whether the requested read data block is stored in its original form (in system cache 104b or on physical storage 110a, 110b), or whether the requested read data block is stored in a different modified form or representation. If the requested read data block (which is stored in its original form) is in the system cache, the read data block is retrieved from the system cache 104b and returned to the host. Otherwise, if the requested read data block is not in the system cache 104b but is stored on the physical storage 110a, 110b in its original form, the requested data block is read by the BE component 104c from the backend storage 110a, 110b, stored in the system cache and then returned to the host.

If the requested read data block is not stored in its original form, the original form of the read data block is recreated and stored in the system cache in its original form so that it can be returned to the host. Thus, requested read data stored on physical storage 110a, 110b can be stored in a modified form where processing is performed by 105a to restore or convert the modified form of the data to its original data form prior to returning the requested read data to the host.

Also illustrated in FIG. 2A is an internal network interconnect 120 between the nodes 102a, 102b. In at least one embodiment, the interconnect 120 can be used for internode communication between the nodes 102a, 102b.

In connection with at least one embodiment in accordance with the techniques of the present disclosure, each processor or CPU can include its own private dedicated CPU cache (also sometimes referred to as processor cache) that is not shared with other processors. In at least one embodiment, the CPU cache, as in general with cache memory, can be a form of fast memory (relatively faster than main memory which can be a form of RAM). In at least one embodiment, the CPU or processor cache is on the same die or chip as the processor and typically, like cache memory in general, is far more expensive to produce than normal RAM used as main memory. The processor cache can be substantially faster than the system RAM used as main memory. The processor cache can contain information that the processor will be immediately and repeatedly accessing. The faster memory of the CPU cache can for example, run at a refresh rate that's closer to the CPU's clock speed, which minimizes wasted cycles. In at least one embodiment, there can be two or more levels (e.g., L1, L2 and L3) of cache. The CPU or processor cache can include at least an L1 level cache that is the local or private CPU cache dedicated for use only by that particular processor. The two or more levels of cache in a system can also include at least one other level of cache (LLC or lower level cache) that is shared among the different CPUs. The L1 level cache serving as the dedicated CPU cache of a processor can be the closest of all cache levels (e.g., L1-L3) to the processor which stores copies of the data from frequently used main memory locations. Thus, the system cache as described herein can include the CPU cache (e.g., the L1 level cache or dedicated private CPU/processor cache) as well as other cache levels (e.g., the LLC) as described herein. Portions of the LLC can be used, for example, to initially cache write data which is then flushed to the backend physical storage such as BE PDs providing non-volatile storage. For example, in at least one embodiment, a RAM based memory can be one of the caching layers used as to cache the write data that is then flushed to the backend physical storage. When the processor performs processing, such as in connection with the inline processing 105$a$, 105$b$ as noted above, data can be loaded from the main memory and/or other lower cache levels into its CPU cache.

In at least one embodiment, the data storage system can be configured to include one or more pairs of nodes, where each pair of nodes can be generally as described and represented as the nodes 102$a$-$b$ in the FIG. 2A. For example, a data storage system can be configured to include at least one pair of nodes and at most a maximum number of node pairs, such as for example, a maximum of 4 node pairs. The maximum number of node pairs can vary with embodiment. In at least one embodiment, a base enclosure can include the minimum single pair of nodes and up to a specified maximum number of PDs. In some embodiments, a single base enclosure can be scaled up to have additional BE non-volatile storage using one or more expansion enclosures, where each expansion enclosure can include a number of additional PDs. Further, in some embodiments, multiple base enclosures can be grouped together in a load-balancing cluster to provide up to the maximum number of node pairs. Consistent with other discussion herein, each node can include one or more processors and memory. In at least one embodiment, each node can include two multi-core processors with each processor of the node having a core count of between 8 and 28 cores. In at least one embodiment, the PDs can all be non-volatile SSDs, such as flash-based storage devices and storage class memory (SCM) devices. It should be noted that the two nodes configured as a pair can also sometimes be referred to as peer nodes. For example, the node A 102$a$ is the peer node of the node B 102$b$, and the node B 102$b$ is the peer node of the node A 102$a$.

In at least one embodiment, the data storage system can be configured to provide both block and file storage services with a system software stack that includes an operating system running directly on the processors of the nodes of the system.

In at least one embodiment, the data storage system can be configured to provide block-only storage services (e.g., no file storage services). A hypervisor can be installed on each of the nodes to provide a virtualized environment of virtual machines (VMs). The system software stack can execute in the virtualized environment deployed on the hypervisor. The system software stack (sometimes referred to as the software stack or stack) can include an operating system running in the context of a VM of the virtualized environment. Additional software components can be included in the system software stack and can also execute in the context of a VM of the virtualized environment.

In at least one embodiment, each pair of nodes can be configured in an active-active configuration as described elsewhere herein, such as in connection with FIG. 2A, where each node of the pair has access to the same PDs providing BE storage for high availability. With the active-active configuration of each pair of nodes, both nodes of the pair process I/O operations or commands and also transfer data to and from the BE PDs attached to the pair. In at least one embodiment, BE PDs attached to one pair of nodes are not shared with other pairs of nodes. A host can access data stored on a BE PD through the node pair associated with or attached to the PD.

In at least one embodiment, each pair of nodes provides a dual node architecture where both nodes of the pair can be generally identical in terms of hardware and software for redundancy and high availability. Consistent with other discussion herein, each node of a pair can perform processing of the different components (e.g., FA, DA, and the like) in the data path or I/O path as well as the control or management path. Thus, in such an embodiment, different components, such as the FA, DA and the like of FIG. 1, can denote logical or functional components implemented by code executing on the one or more processors of each node. Each node of the pair can include its own resources such as its own local (i.e., used only by the node) resources such as local processor(s), local memory, and the like.

Consistent with other discussion herein, a cache can be used for caching write I/O data and other cached information. In one system, the cache used for caching logged writes can be implemented using multiple caching devices or PDs, such as non-volatile (NV) SSDs such as NVRAM devices that are external with respect to both of the nodes or storage controllers. The caching devices or PDs used to implement the cache can be configured in a RAID group of any suitable RAID level for data protection. In at least one embodiment, the caching PDs form a shared non-volatile cache accessible to both nodes of the dual node architecture. It should be noted that in a system where the caching devices or PDs are external with respect to the two nodes, the caching devices or PDs are in addition to other non-volatile PDs accessible to both nodes. The additional PDs provide the BE non-volatile storage for the nodes where the cached data stored on the caching devices or PDs is eventually flushed to the BE PDs as discussed elsewhere herein. In at least one embodiment, a portion of each node's local volatile memory can also be used for caching information, such as blocks or pages of user data and metadata. For example, such node-local cached pages of user data and metadata can be used in connection with servicing reads for such user data and metadata.

In the following paragraphs, the one or more caching devices or PDs may be referred to as a data journal or log used in the data storage system. In such a system, the caching devices or PDs are non-volatile log devices or PDs upon which the log is persistently stored. It should be noted that as discussed elsewhere herein, both nodes can also each have local volatile memory used as a node local cache for storing data, structures and other information. In at least one embodiment, the local volatile memory local to one of the nodes is used exclusively by that one node.

In a data storage system, minimizing the latency of I/O requests is a critical performance metric. In at least one data storage system using the dual node architecture such as described in connection with FIG. 2A, for write operations, latency can be affected by the amount of time taken to store the write data in the log where the write data is visible to both nodes or controllers of the system.

Consistent with other discussion herein, the log file used to log user operations, such as write I/Os, can be used to optimize write operation latency. Generally, a write operation writing data is received by the data storage system from a host or other client. The data storage system then performs processing to persistently record the write operation in the log. Once the write operation is persistently recorded in the log, the data storage system can send an acknowledgement to the client regarding successful completion of the write operation. At some point in time subsequent to logging the write operation the log, the write operation is flushed or destaged from the log to the BE PDs. In connection with flushing the recorded write operation from the log, the data written by the write operation is stored on non-volatile physical storage of a BE PD. The space of the log used to record the write operation that has been flushed can now be reclaimed for reuse.

It should be noted that the flushing of the log can be performed in response to an occurrence of any one or more defined conditions. For example, the log can be flushed in response to determining that the amount of reclaimed log space available for use and allocation is less than a specified threshold amount or size.

In at least one embodiment, a metadata (MD) structure of mapping information can be used in accordance with the techniques herein.

The mapping information can be used, for example, to map a logical address, such as a LUN and an LBA or offset, to its corresponding storage location, such as a physical storage location on BE non-volatile PDs of the system. Consistent with discussion elsewhere herein, write requests or operations stored in the log can be flushed to the BE PDs (non-volatile) providing storage locations for the written data. For example, a logged write operation that writes first data to a logical address can be flushed whereby the logged first data is written out to a physical storage location on a BE PD. The mapping information can be used to map the logical address to the physical storage location containing the content or data stored at the logical address. In at least one embodiment, the mapping information includes a MD structure that is hierarchical structure of multiple layers of MD pages or blocks.

Figure 3:
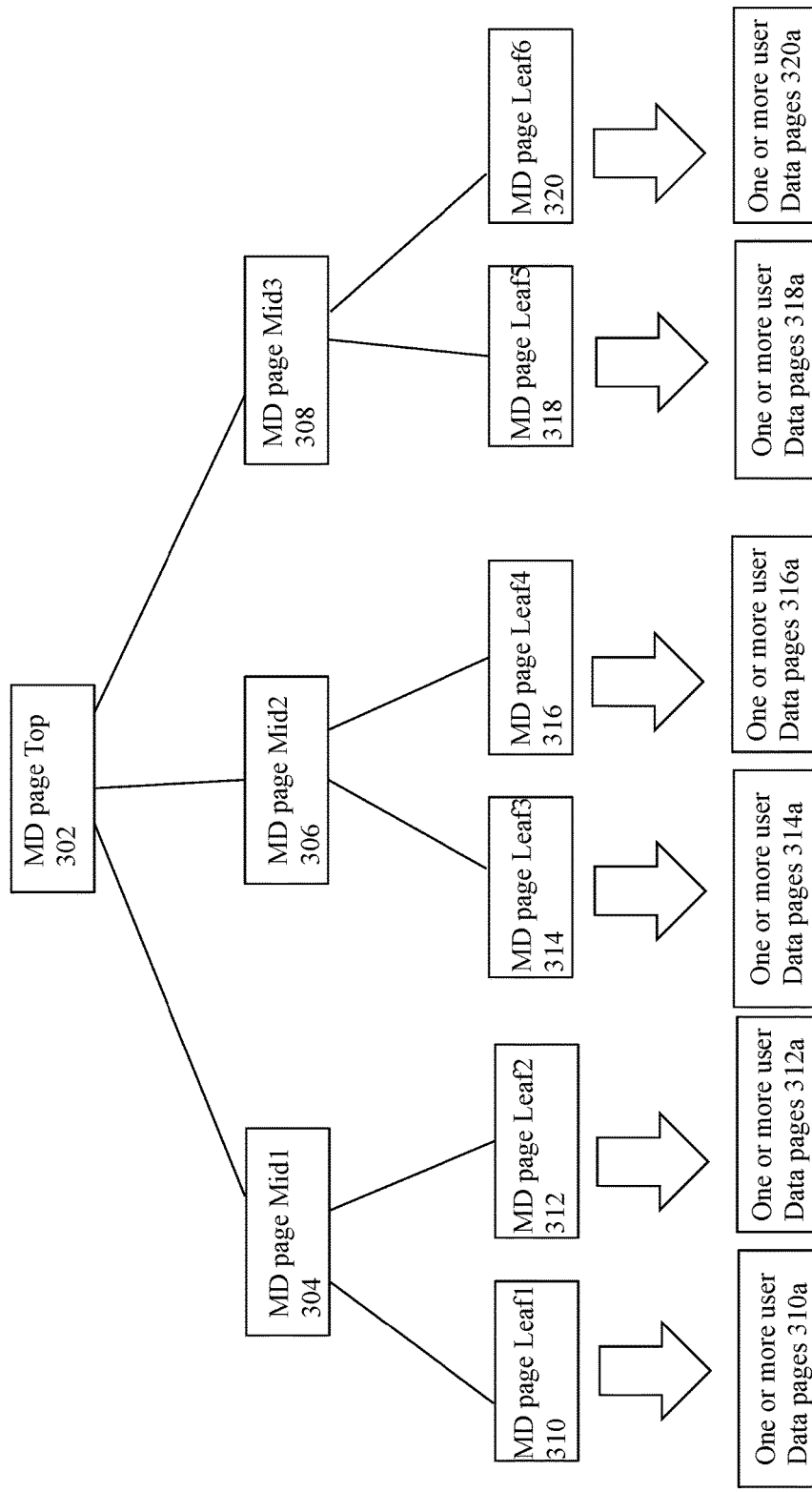
FIGS. 3, 4, 5, and 6 are examples of mapping information in the form of a metadata structure that can be used in connection with mapping logical addresses to physical addresses or storage locations in at least one embodiment in accordance with the techniques of the present disclosure.

In at least one embodiment, the mapping information or MD structure for a LUN, such as a LUN A, can be in the form of a tree having a plurality of levels of MD pages. More generally, the mapping structure can be in the form of any ordered list or hierarchical structure. In at least one embodiment, the mapping structure for the LUN A can include LUN MD in the form of a tree having 3 levels including a single top or root node (TOP node), a single mid-level (MID node) and a bottom level of leaf nodes (LEAF nodes), where each of the MD page leaf nodes can point to, or reference (directly or indirectly) one or more pages of stored data, such as user data stored on the LUN A. Each node in the tree corresponds to a MD page including MD for the LUN A. More generally, the tree or other hierarchical structure of various MD pages of the mapping structure for the LUN A can include any suitable number of levels, such as more than 3 levels where there are multiple mid-levels. In at least one embodiment the tree of MD pages for the LUN can be a B+ tree, also sometimes referred to as an "N-ary" tree, where "N" indicates that each node in the tree structure can have up to a maximum of N child nodes. For example, in at least one embodiment, the tree of MD pages for the LUN can specify N=512 whereby each node in the tree structure can have up to a maximum of N child nodes. For simplicity of illustration, the tree structure of MD pages, corresponding to the mapping structure in at least one embodiment, is represented in FIG. 3 as including only 3 levels where each node in the tree can have at most 3 child nodes. Generally, the techniques herein can be used with any layered or hierarchical structure of MD pages.

Before describing in more detail the mapping information of MD pages that can be used in an at least one embodiment to map a logical address to a corresponding physical storage location or address, further details are described in connection with using a log for logging user or client operations, such as write I/Os.

Consistent with other discussion herein, the log can be used to optimize write operation latency. Generally, the write operation writing data is received by the data storage system from a host or other client. The data storage system then performs processing to persistently record the write operation in the log. Once the write operation is persistently recorded in the log, the data storage system can send an acknowledgement to the client regarding successful completion of the write operation. At some point in time subsequent to logging the write operation the log, the write operation is flushed or destaged from the log to the BE PDs. In connection with flushing the recorded write operation from the log, the data written by the write operation is stored on non-volatile physical storage of a BE PD. The space of the log used to record the write operation that has been flushed can now be reclaimed for reuse. The write operation can be recorded in the log in any suitable manner and can include, for example, recording a target logical address to which the write operation is directed and recording the data written to the target logical address by the write operation.

In the log, each logged operation can be recorded in the next logically sequential record of the log. For example, a logged write I/O and write data (e.g., write I/O payload) can be recorded in a next logically sequential record of the log. The log can be circular in nature in that once a write operation is recorded in the last record of the log, recording of the next write proceeds with recording in the first record of the log.

The typical I/O pattern for the log as a result of recording write I/Os and possibly other information in successive consecutive log records includes logically sequential and logically contiguous writes (e.g., logically with respect to the logical offset or ordering within the log). Data can also be read from the log as needed (e.g., depending on the particular use or application of the log) so typical I/O patterns can also include reads. The log can have a physical storage layout corresponding to the sequential and contiguous order in which the data is written to the log. Thus, the log data can be written to sequential and consecutive physical storage locations in a manner corresponding to the logical sequential and contiguous order of the data in the log. Additional detail regarding use and implementation of the log in at least one embodiment in accordance with the techniques of the present disclosure is provided below.

Figure 2B:
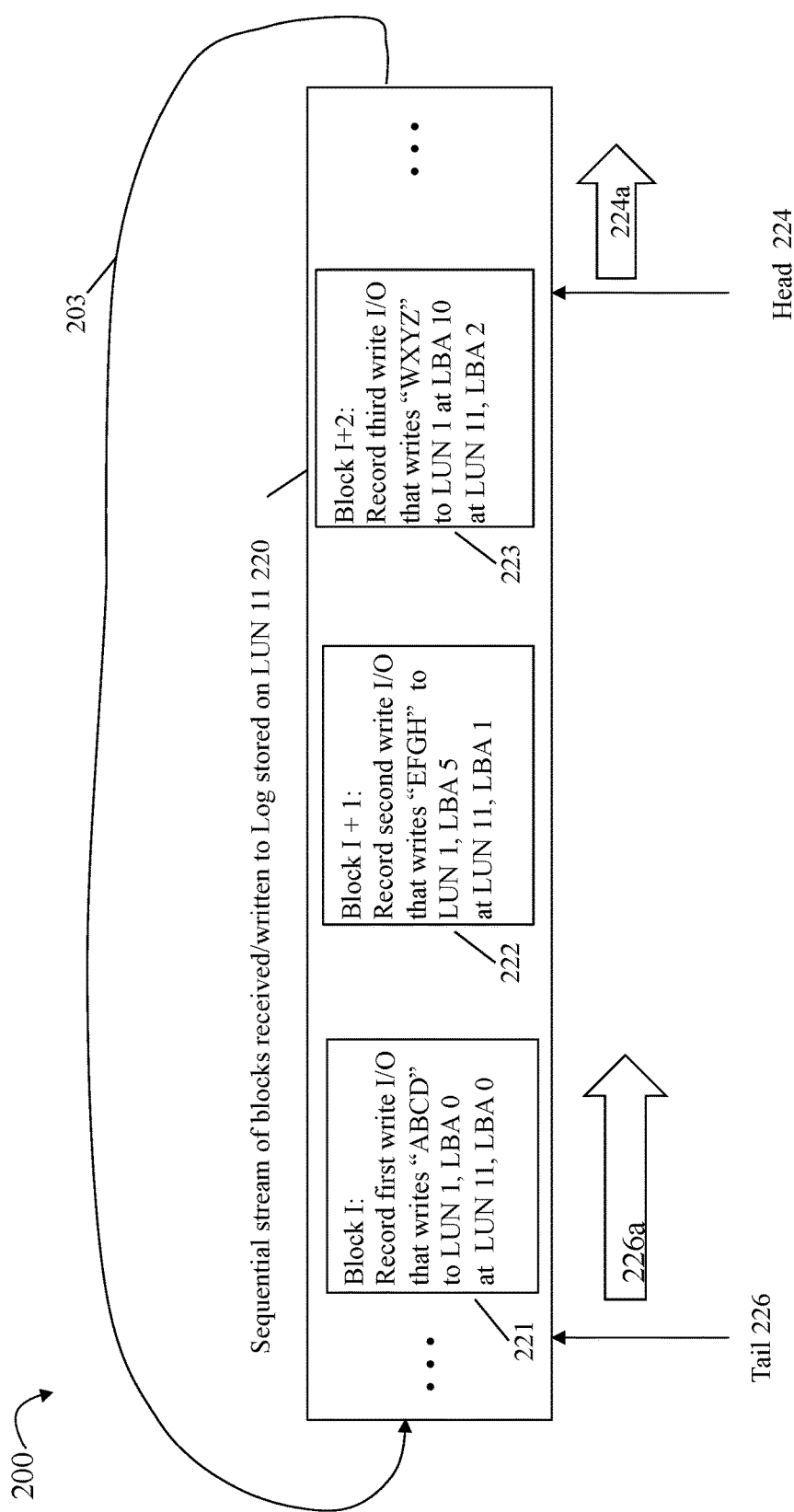
FIGS. 2B, 2C and 2D are examples illustrating use of a log or journal recording client operations in at least one embodiment in accordance with the techniques of the present disclosure.

Referring to FIG. 2B, shown is an example 200 illustrating a sequential stream 220 of operations or requests received that are written to a log in an embodiment in accordance with the techniques of the present disclosure. In this example, the log can be stored on the LUN 11 where logged operations or requests, such as write I/Os that write user data to a file, target LUN or other storage object, are recorded as records in the log. The element 220 includes information or records of the log for 3 write I/Os or updates which are recorded in the records or blocks I 221, I+1 222 and I+2 223 of the log (e.g., where I denotes an integer offset of a record or logical location in the log). The blocks I 221, I+1 222, and I+2 223 can be written sequentially in the foregoing order for processing in the data storage system. The block 221 can correspond to the record or block I of the log stored at LUN 11, LBA 0 that logs a first write I/O operation. The first write I/O operation can write "ABCD" to the target logical address LUN 1, LBA 0. The block 222 can correspond to the record or block I+1 of the log stored at LUN 11, LBA 1 that logs a second write I/O operation. The second write I/O operation can write "EFGH" to the target logical address LUN 1, LBA 5. The block 223 can correspond to the record or block I+2 of the log stored at LUN 11, LBA 2 that logs a third write I/O operation. The third write I/O operation can write "WXYZ" to the target logical address LUN 1, LBA 10. Thus, each of the foregoing 3 write I/O operations logged in 221, 222 and 223 write to 3 different logical target addresses or locations each denoted by a target LUN and logical offset on the target LUN. As illustrated in the FIG. 2B, the information recorded in each of the foregoing records or blocks 221, 222 and 223 of the log can include the target logical address to which data is written and the write data written to the target logical address.

The head pointer 224 can denote the next free record or block of the log used to record or log the next write I/O operation. The head pointer can be advanced 224a to the next record in the log as each next write I/O operation is recorded. When the head pointer 224 reaches the end of the log by writing to the last sequential block or record of the log, the head pointer can advance 203 to the first sequential block or record of the log in a circular manner and continue processing. The tail pointer 226 can denote the next record or block of a recorded write I/O operation in the log to be destaged and flushed from the log. Recorded or logged write I/Os of the log are processed and flushed whereby the recorded write I/O operation that writes to a target logical address or location (e.g., target LUN and offset) is read from the log and then executed or applied to a non-volatile BE PD location mapped to the target logical address (e.g., where the BE PD location stores the data content of the target logical address). Thus, as records are flushed from the log, the tail pointer 226 can logically advance 226a sequentially (e.g., advance to the right toward the head pointer and toward the end of the log) to a new tail position. Once a record or block of the log is flushed, the record or block is freed for reuse in recording another write I/O operation. When the tail pointer reaches the end of the log by flushing the last sequential block or record of the log, the tail pointer advances 203 to the first sequential block or record of the log in a circular manner and continue processing. Thus, the circular logical manner in which the records or blocks of the log are processed form a ring buffer in which the write I/Os are recorded.

When a write I/O operation writing user data to a target logical address is persistently recorded and stored in the non-volatile log, the write I/O operation is considered complete and can be acknowledged as complete to the host or other client originating the write I/O operation to reduce the write I/O latency and response time. The write I/O operation and write data are destaged at a later point in time during a flushing process that flushes a recorded write of the log to the BE non-volatile PDs, updates and writes any corresponding metadata for the flushed write I/O operation, and frees the record or block of the log (e.g., where the record or block logged the write I/O operation just flushed). The metadata updated as part of the flushing process for the target logical address of the write I/O operation can include mapping information as described elsewhere herein. The mapping information of the metadata for the target logical address can identify the physical address or location on provisioned physical storage on a non-volatile BE PD storing the data of the target logical address. The target logical address can be, for example, a logical address on a logical device, such as a LUN and offset or LBA on the LUN.

Figure 2C:
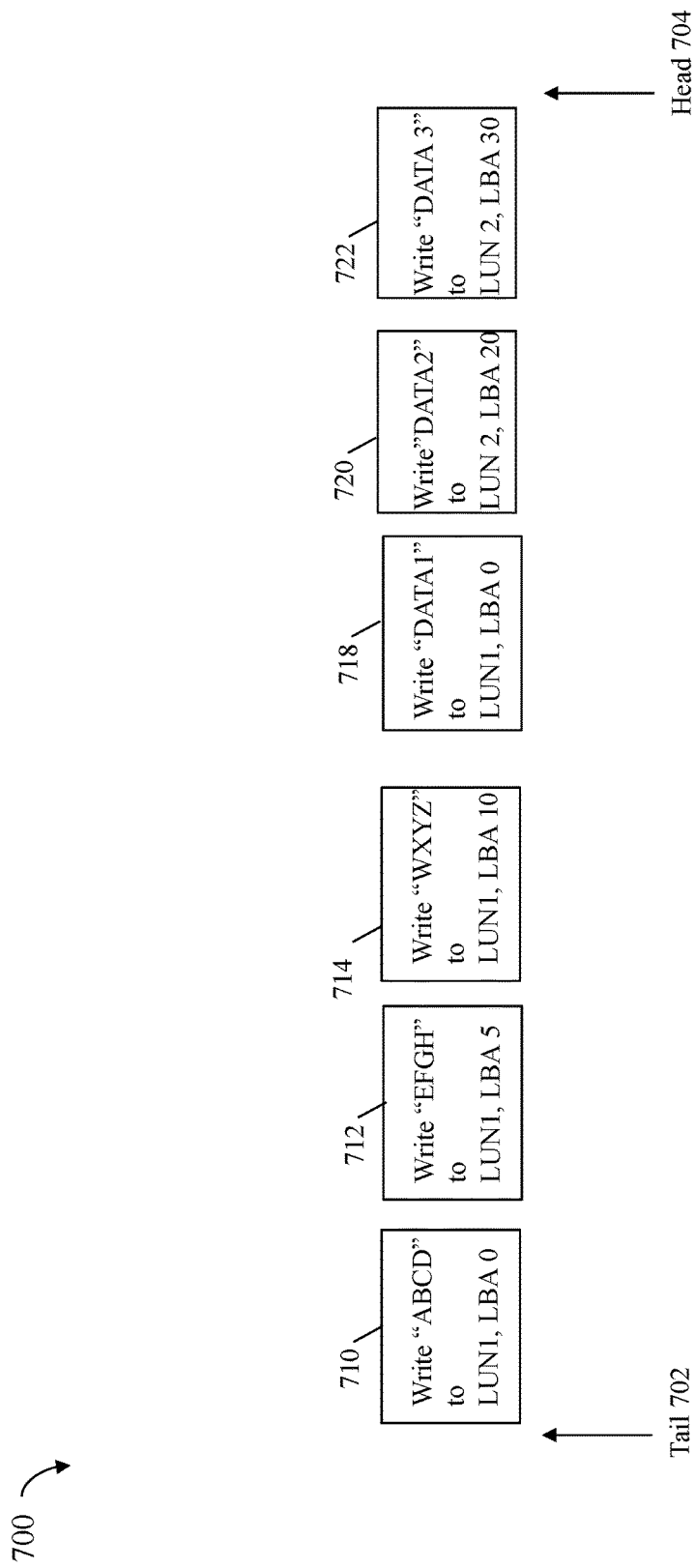

Referring to FIG. 2C, shown is an example of information that can be included in a log, such as a log of user or client write operations, in an embodiment in accordance with the techniques of the present disclosure.

The example 700 includes the head pointer 704 and the tail pointer 702. The elements 710, 712, 714, 718, 720 and 722 denote 6 records of the log for 6 write I/O operations recorded in the log. The element 710 is a log record for a write operation that writes "ABCD" to the LUN 1, LBA 0. The element 712 is a log record for a write operation that writes "EFGH" to the LUN 1, LBA 5. The element 714 is a log record for a write operation that writes "WXYZ" to the LUN 1, LBA 10. The element 718 is a log record for a write operation that writes "DATA1" to the LUN 1, LBA 0. The element 720 is a log record for a write operation that writes "DATA2" to the LUN 2, LBA 20. The element 722 is a log record for a write operation that writes "DATA3" to the LUN 2, LBA 30. As illustrated in FIG. 2C, the log records 710, 712, 714, 718, 720 and 722 can also record the write data (e.g., write I/O operation payload) written by the write operations. It should be noted that the log records 710, 712 and 714 of FIG. 2C correspond respectively to the log records 221, 222 and 223 of FIG. 2B.

The log can be flushed sequentially or in any suitable manner to maintain desired data consistency. In order to maintain data consistency when flushing the log, constraints can be placed on an order in which the records of the log are flushed or logically applied to the stored data while still allowing any desired optimizations. In some embodiments, portions of the log can be flushed in parallel in accordance with any necessary constraints needed in order to maintain data consistency. Such constraints can consider any possible data dependencies between logged writes (e.g., two logged writes that write to the same logical address) and other logged operations in order to ensure write order consistency.

Figure 2D:
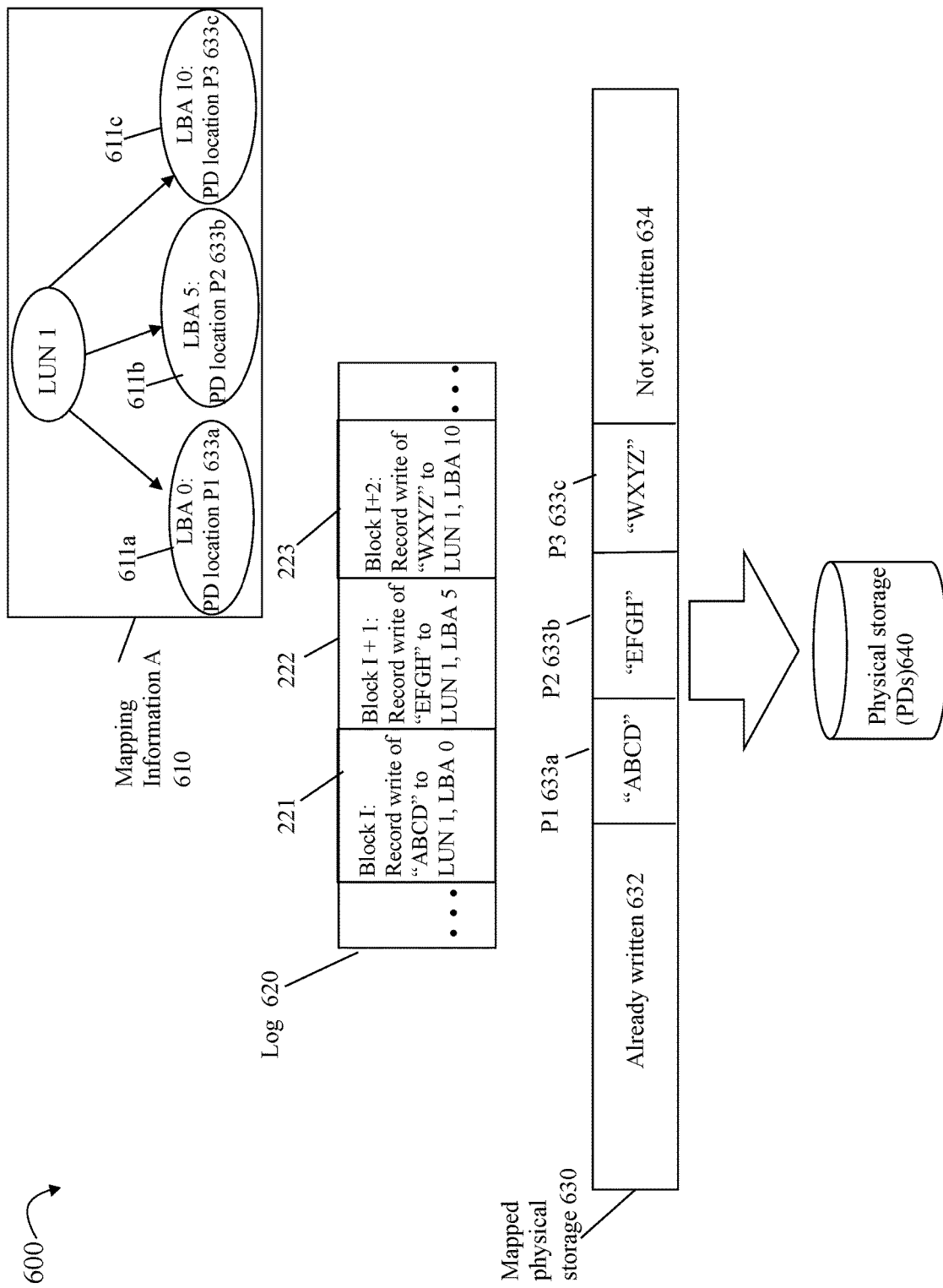

Referring to FIG. 2D, shown is an example 600 illustrating the flushing of logged writes and the physical data layout of user data on BE PDs in at least one embodiment in accordance with the techniques of the present disclosure. FIG. 2D includes the log 620, the mapping information A 610, and the physical storage (i.e., BE PDs) 640. The element 630 represents the physical layout of the user data as stored on the physical storage 640. The element 610 can represent the logical to physical storage mapping information A 610 created for 3 write I/O operations recorded in the log records or blocks 221, 222 and 223.

The mapping information A 610 includes the elements 611a-c denoting the mapping information, respectively, for the 3 target logical address of the 3 recorded write I/O operations in the log records 221, 222, and 223. The element 611a of the mapping information denotes the mapping information for the target logical address LUN1, LBA 0 of the block 221 of the log 620. In particular, the block 221 and mapping information 611a indicate that the user data "ABCD" written to LUN 1, LBA 0 is stored at the physical location (PD location) P1 633a on the physical storage 640. The element 611b of the mapping information denotes the mapping information for the target logical address LUN1, LBA 5 of the block 222 of the log 620. In particular, the block 222 and mapping information 611*b* indicate that the user data "EFGH" written to LUN 1, LBA 5 is stored at the physical location (PD location) P2 633*b* on the physical storage 640. The element 611*c* of the mapping information denotes the mapping information for the target logical address LUN 1, LBA 10 of the block 223 of the log 620. In particular, the block 223 and mapping information 611 indicate that the user data "WXYZ" written to LUN 1, LBA 10 is stored at the physical location (PD location) P3 633*c* on the physical storage 640.

The mapped physical storage 630 illustrates the sequential contiguous manner in which user data can be stored and written to the physical storage 640 as the log records or blocks are flushed. In this example, the records of the log 620 can be flushed and processing sequentially (e.g., such as described in connection with FIG. 2B) and the user data of the logged writes can be sequentially written to the mapped physical storage 630 as the records of the log are sequentially processed. As the user data pages of the logged writes to the target logical addresses are written out to sequential physical locations on the mapped physical storage 630, corresponding mapping information for the target logical addresses can be updated. The user data of the logged writes can be written to mapped physical storage sequentially as follows: 632, 633*a*, 633*b*, 633*c* and 634. The element 632 denotes the physical locations of the user data written and stored on the BE PDs for the log records processed prior to the block or record 221. The element 633*a* denotes the PD location P1 of the user data "ABCD" stored at LUN 1, LBA 1. The element 633*b* denotes the PD location P2 of the user data "EFGH" stored at LUN 1, LBA 5. The element 633*c* denotes the PD location P3 of the user data "WXYZ" stored at LUN 1, LBA 10. The element 634 denotes the physical locations of the user data written and stored on the BE PDs for the log records processed after the block or record 223.

In one aspect, the data layout (e.g., format or structure) of the log-based data of the log 620 as stored on non-volatile storage can also be physically sequential and contiguous where the non-volatile storage used for the log can be viewed logically as one large log having data that is laid out sequentially in the order it is written to the log.

The data layout of the user data as stored on the BE PDs can also be physically sequential and contiguous. As log records of the log 620 are flushed, the user data written by each flushed log record can be stored at the next sequential physical location on the BE PDs. Thus, flushing the log can result in writing user data pages or blocks to sequential consecutive physical locations on the BE PDs. In some embodiments, multiple logged writes can be flushed in parallel as a larger chunk to the next sequential chunk or portion of the mapped physical storage 630.

Consistent with other discussion herein, the mapped physical storage 630 can correspond to the BE PDs providing BE non-volatile storage used for persistently storing user data as well as metadata, such as the mapping information. With a log-structured system as discussed herein, as recorded writes in the log are processed, the data written by the writes can be written to new physical storage locations on the BE PDs.

Referring to FIG. 3, shown is an example 300 of a tree of MD pages that can be used in an embodiment in accordance with the techniques herein. The example 300 includes a tree of MD pages denoting the mapping structure as discussed above with 3 levels—a top or root level, level 1, including a single MD TOP page; a single mid or middle level, level 2, of MD MID pages; and a bottom level, level 3, of leaf nodes of MD LEAF pages. In the example 300, the top or root level, level 1, includes MD page 302; the mid or middle level, level 2, includes MD pages 304, 306 and 308; and the bottom level, level 3, includes MD pages 310, 312, 314, 316, 318 and 320, which can also be referred to as leaf nodes. As also illustrated in the example 300, each of the leaf MD pages in level 3 of the tree points to, or references (e.g., directly or otherwise indirectly using one more additional levels of indirection of pointers not illustrated) one or more user data pages or blocks including data stored at various LBAs of a LUN such as the LUN A. For example, MD pages 310, 312, 314, 316, 318 and 320 point or reference, respectively, one or more UD pages 310*a*, 312*a*, 314*a*, 316*a*, 318*a* and 320*a*.

The links or connections between a parent node (at level M) and its one or more child nodes (at level M+1) in the tree 300 generally represent mappings between the parent node and the one or more child nodes. In at least one embodiment, the parent node can include a reference used to access (directly or indirectly) each of its one or more child nodes. For example, the root node MD page top 302 can include addresses or pointers used to access each of its child nodes 304, 306 and 308. The mid-level node MD page mid1 304 can include addresses or pointers used to access each of its child leaf nodes 310, 312. The mid-level node MD page mid 306 can include addresses or pointers used to access each of its child leaf nodes 314, 316. The mid-level node MD page mid 308 can include addresses or pointers used to access each of its child leaf nodes 318, 320.

In at least one embodiment, each of the addresses or pointers included in a MD page that references a location in another MD page or references a location in a UD page can be a physical storage location on the back-end PDs. Thus, the traversal between connected nodes of the structure 300 can correspond to traversing physical address or storage locations included in pages or nodes that are parent nodes.

In connection with accessing a particular UD page in at least one embodiment, all MD pages in a path from the root or top level of the tree to the UD page can be traversed in a consecutive serialized order in which such pages appear in the path traversal down the path from the top or root level to the UD page accessed using a particular one of the MD page leaf nodes. For example, assume UD page or block X is included in the set of UD pages 312*a*. In order to access UD page X of 312*a*, the following denotes the consecutive serialized order in which the MD pages forming a sequence are accessed: MD page top 302, MD page mid1 304, and MD page leaf2 312. Generally, in at least one embodiment, each of the MD pages can include pointers or addresses to locations of one or more child pages or nodes. Thus, the foregoing traversal of MD pages denotes the sequence of MD pages that are processed in consecutive serialized order in order to access the particular UD page, such as UD page X. In order to access the UD page X as stored on PDs where UD page X includes first data needed to service a read I/O operation in connection with a cache miss of the first data, each of the MD pages in the foregoing sequence (e.g., MD page top 302, MD page mid1 304, and MD page leaf2 312) needs to be accessed in consecutive serialized order. In at least one embodiment, the sequence of MD pages, and more generally, the path from the MD page top to the UD page X, forms a linked list of nodes of pages. In at least one embodiment, each parent node or MD page of the structure 300 can generally include multiple pointers or references to locations of its child nodes or pages. For example, MD page top 302 includes pointers to locations of its child nodes, MD pages 304, 306 and 308. MD page mid2 306 includes pointers to locations of its child nodes, MD pages 314 and 316.

The data pages 310a, 312a, 314a, 316a, 318a and 320a include UD stored on particular logical addresses of a LUN's address space, such as the LUN A's logical address space. In at least one embodiment each MD leaf can hold MD for a specified number of LBAs of a LUN. For example, in one embodiment each MD leaf can hold MD for 512 LBAs. For example, with reference to FIG. 3, the data pages 310a, 312a, 314a, 316a, 318a and 320 each include user data stored on particular logical addresses of the LUN A's logical address space. It may be, for example, that element 310a includes user data stored at a first set of LBAs 0-511; and that element 312a includes user data stored at a second set of LBAs 512-1023. Generally, the particular LBAs of the LUN mapped to each MD page can vary with embodiment. For example, in at least one embodiment, consecutive sequential subranges of the LUN's logical address space can be mapped to the MD page leaves. Additionally, when the tree is traversed in a depth first manner, the MD page leaves can correspond to consecutive sequential subranges. For example, the element 310a denotes data pages for LBAs 0-511; the element 312a denotes data pages for the LBAs 512-1023; the element 314a denotes data pages for LBAs 1024-1535; the element 316a denotes data pages for LBAs 1536-2047, and so on.

As generally known in the art, a depth-first traversal is an algorithm for traversing or tree or graph data structures. The algorithm starts at the root node (selecting some arbitrary node as the root node in the case of a graph) and explores as far as possible along each path extending from the root to a leaf node before backtracking up the path to find a yet another unexplored path. In at least one embodiment, traversal of the tree 300 of MD pages in a depth-first manner explores all paths, in sequential order, from the left-most path to the right most path as arranged in the tree.

In at least one embodiment, when the structure 300 is traversed in a depth first manner (i.e., from the left-most path to the right most path as arranged in the tree), the MD page leaf nodes that occur in the depth first traversal correspond to consecutive sequential LBA subranges of a LUN. In at least one embodiment, when the overall tree including MD page top node 302 and all its descendant nodes are traversed in this depth first manner, the MD page leaf nodes that occur in the depth first traversal correspond to consecutive sequential LBA subranges of a LUN.

In at least one embodiment as described herein, each of the MD pages and data blocks in the example 300 can be of a predetermined size and each of the MD pages can hold a known number of entries containing pointer or address values. In such a case and in combination with the correspondence of sequential consecutive LBA ranges of each MD leaf page, an embodiment can perform a calculation to determine the MD page at a particular level that is accessed in the tree MD mapping structure 300 to determine the data block for a particular LUN and LBA. Similarly, it is a straightforward mathematical calculation to determine the index, offset of entry in a particular page or node to be accessed in connection with obtaining data blocks stored at the particular LUN and LBAs of the LUN. Each MD page in 300 can be known to include MD relevant for accessing data on a particular LUN and one or more LBAs of that LUN. For example, consistent with discussion above, the element 310a denotes the data blocks for LBAs 0-511 of a LUN. In order to access the data block for an LBA of the LUN in the LBA subrange 0-511, MD pages 302, 304 and 310 can be traversed in sequential order. In particular, the first entry or offset of the MD page top 302 can contain the address of the MD page mid 1 304; the first entry or offset of the MD page mid 1 304 can contain the address of the MD page leaf 1 310; and the first entry or offset of the MD page leaf 1 310 can contain the address of one of the data blocks of 310a.

In a similar manner, a mapping can be made regarding what MD pages of the structure 300 and entries thereof are used in connection with obtaining data blocks containing data for any particular LUN and LBA. In at least one embodiment, the particular MD pages used to access a data block including data for a particular LUN and LBA can be known based on such mappings and correspondence of LBA subranges to particular MD leaf pages.

Figure 4:
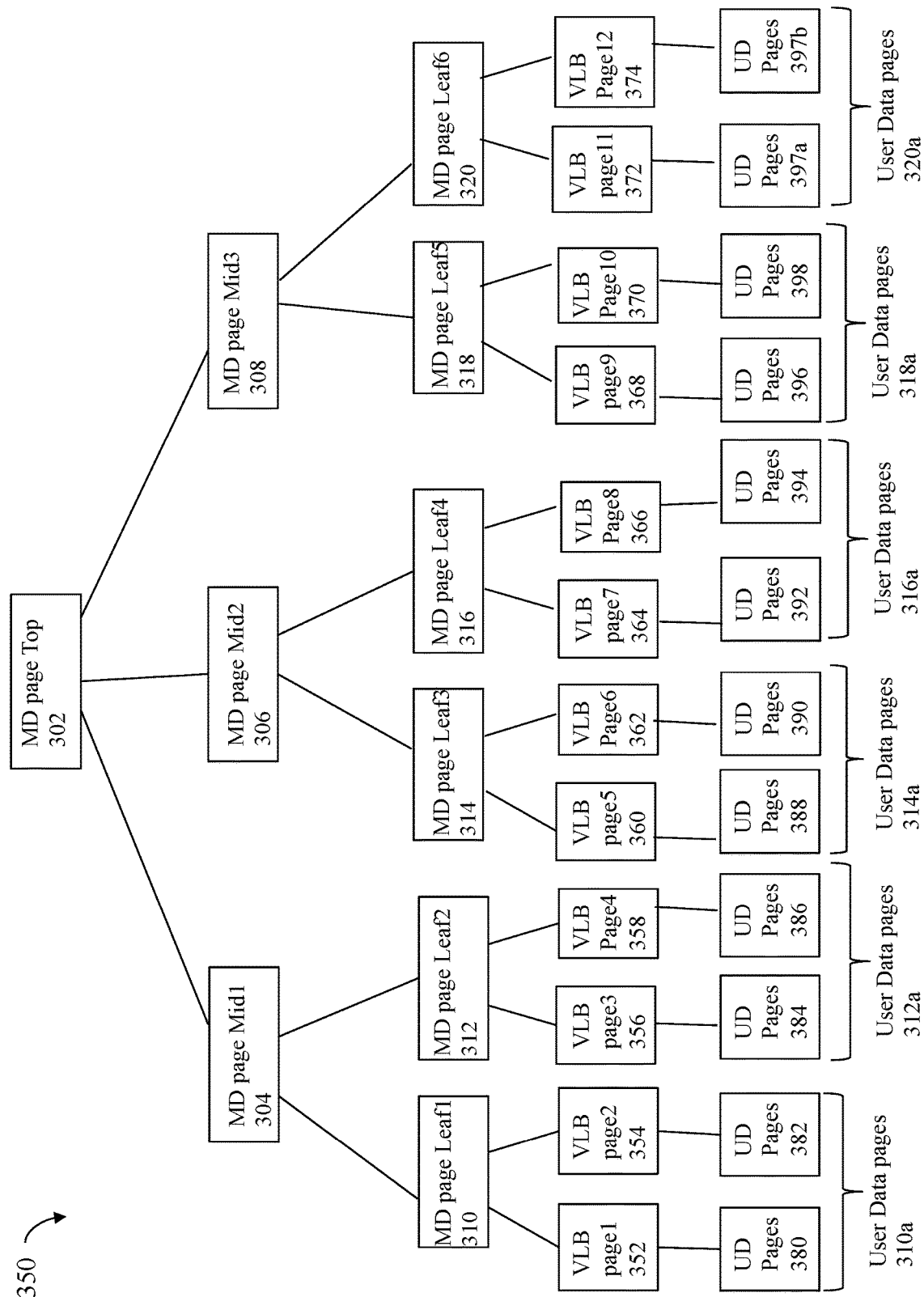

Referring to FIG. 4, shown is a more detailed version of a hierarchical structure used as the mapping structure 108 that can be used in an embodiment in accordance with the techniques of the present disclosure. The structure 350 is similar to the structure 300 as described and illustrated in FIG. 3 with the added difference that more detail is provided regarding the intervening layer of a VLB (virtualization layer block) MD pages between the MD page leaves and the UD pages. Thus, in such an embodiment, the structure 350 includes 4 levels of MD pages as opposed to the possible 3 levels as allowed in the more generalized structure 300 represented in FIG. 3. In this case, each sequence of MD pages traversed in a path from the MD page top or root to access a particular UD page includes 4 MD pages—MD page top 302, one of the MD page Mid nodes (e.g., one of 304, 306 or 308), one of the MD page leaf nodes (e.g., one of 310, 312, 314, 316, 318 and 320), and one of the VLB pages (e.g., one of 352, 354, 356, 358, 360, 362, 364, 366, 368, 370, 372 and 374).

In at least one embodiment, the use of VLBs as a layer in the hierarchy between the MD leaf nodes and the UD pages can be used to facilitate different data storage services, such as relocating UD between different physical storage location, data deduplication, and the like. An entry of the VLB associated with a particular physical storage location can be remapped without requiring remapping of a MD leaf to the UD page.

The UD pages 380 and 382 denote two portions of UD pages corresponding to UD pages 310a of FIG. 3 including data for LBAs 0-511. The UD pages 384 and 386 denote two portions of UD pages corresponding to UD pages 312a of FIG. 3 including data for LBAs 512-1023. The UD pages 388 and 390 denote two portions of UD pages corresponding to UD pages 314a of FIG. 3 including data for LBAs 1024-1535. The UD pages 392 and 394 denote two portions of UD pages corresponding to UD pages 316a of FIG. 3 including data for LBAs 1536-2047. The UD pages 396 and 398 denote two portions of UD pages corresponding to UD pages 318a of FIG. 3 including data for LBAs 2048-2559. The UD pages 397a and 397b denote two portions of UD pages corresponding to UD pages 320a of FIG. 3 including data for LBAs 2560-3072.

In furtherance of the example above regarding UD page X and now with reference to FIG. 4, assume more specifically that UD page X is located in the set of UD pages denoted by 384. In this case, the MD page sequence including the MD pages traversed in order to access UD page X 384 includes MD page 302, MD page 304, MD page 312, and VLB page3 356.

Figure 5:
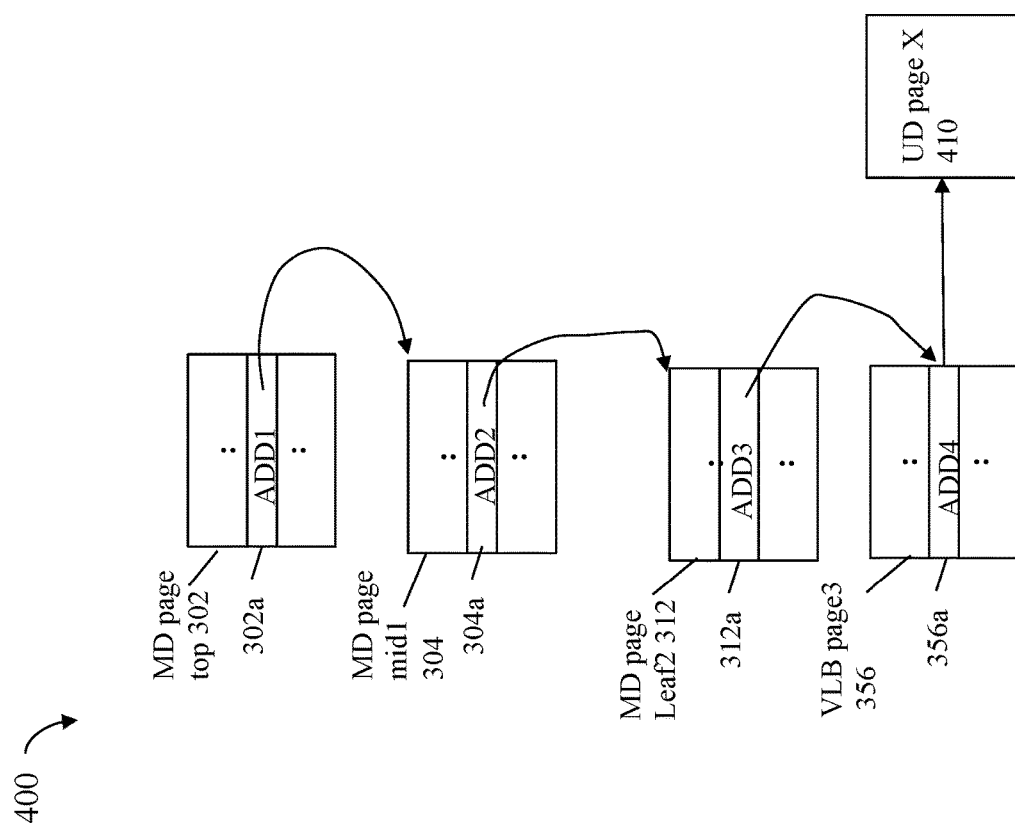

Referring to FIG. 5, shown is a more detailed representation 400 of the MD pages of the sequence traversed to access the UD page X 384 included in the set of UD pages 312a. As noted above, the MD page sequence includes MD page 302, MD page 304, MD page 312, and VLB page3 356. In the example 400, MD page top 302 includes an entry or address 302a that points to or references the MD page mid1 304. In at least one embodiment, the starting entry 302a in the first MD page 302 of the sequence can be determined based on the logical address including the desired UD stored in a page or block of storage (e.g., physical non-volatile storage location on the BE PDs of the system). For example, assume processing is performed to read the UD for LUN A, LBA 514 located in UD page X. In at least one embodiment, the logical address LUN A, LBA 514 can be used to determine the particular structure instance and thus the particular MD page top 302 to access. The LBA 514 of the logical address of the UD can also be used to determine an index or offset into the MD page 302 to determine the relevant entry, location or address 302a having a pointer, address or reference to the next MD page in the sequence to access the desired page including the UD for LUN A, LBA 514. An embodiment can generally use any suitable technique to map a corresponding logical address, such as an LBA of a particular LUN, to an entry in the top level MD page 302.

The MD page top 302 can be accessed and read from a PD to obtain the address or pointer ADD1 from location 302a. If the MD page 302 is already in cache, the cached copy can be used to obtain the address or pointer ADD1 from the location 302a. The address or pointer ADD1 of location 302a can then be used to identify the particular mid level MD page, such as MD page mid1 304, that is accessed next in the sequence.

Continuing with the example 400, the MD page mid1 304 can be accessed where the location 304a is read to obtain the address or pointer ADD2 from location 304a. In at least one embodiment, the particular entry or offset 304a of the MD mid1 page can be determined based on the logical address being mapped.

The address or pointer ADD2 can then be used to identify the particular leaf level MD page, such as MD page leaf2 312, that is next accessed in the sequence. If the MD page mid1 304 is not in cache, the on-disk copy of the MD page 304 on a PD can be accessed to read the address or pointer ADD2 from the location 304a. The address or pointer ADD2 identifies the MD page leaf 2 312. If the MD page 312 is not already in cache, the on-disk copy of the MD page 312 on a PD can be read to obtain the content of location 312a.

In at least one embodiment, the particular desired entry or offset 312a of the MD leaf2 page 312 can be determined based on the logical address being mapped. The location 312a of the MD page leaf2 312 can be accessed and read to obtain the address or pointer ADD3 from location 312a. The address or pointer ADD3 can then be used to identify a particular entry of a VLB page, such as the entry 356a of the VLB page3 356, that is next accessed in the sequence. Thus, ADD3 can denote the location or address of the entry 356a in the VLB page 3 356.

If the VLB page 356 is not already in cache, the on-disk copy of the VLB page 356 on a PD can be read to obtain the content of location 356a. The location 356a of the VLB page 3 356 can be accessed and read to obtain the address or pointer ADD4 from the location 356a. The address or pointer ADD4 can then be used to identify the particular UD page X 410 where the UD page X can next be read. If the UD page X is not in cache, the on-disk copy of the UD page X can be read in from a PD.

The example 400 of FIG. 5 includes the path or traversal of MD pages in the structure 350 from the MD page root or top 302 to the UD page X of 384 including the desired UD for the logical address LUN A, LBA 514. The path or traversal of MD pages 302, 304, 312, 356 and 384 denotes the sequence of MD pages read and accessed in order to obtain the UD page X of 384.

Figure 6:
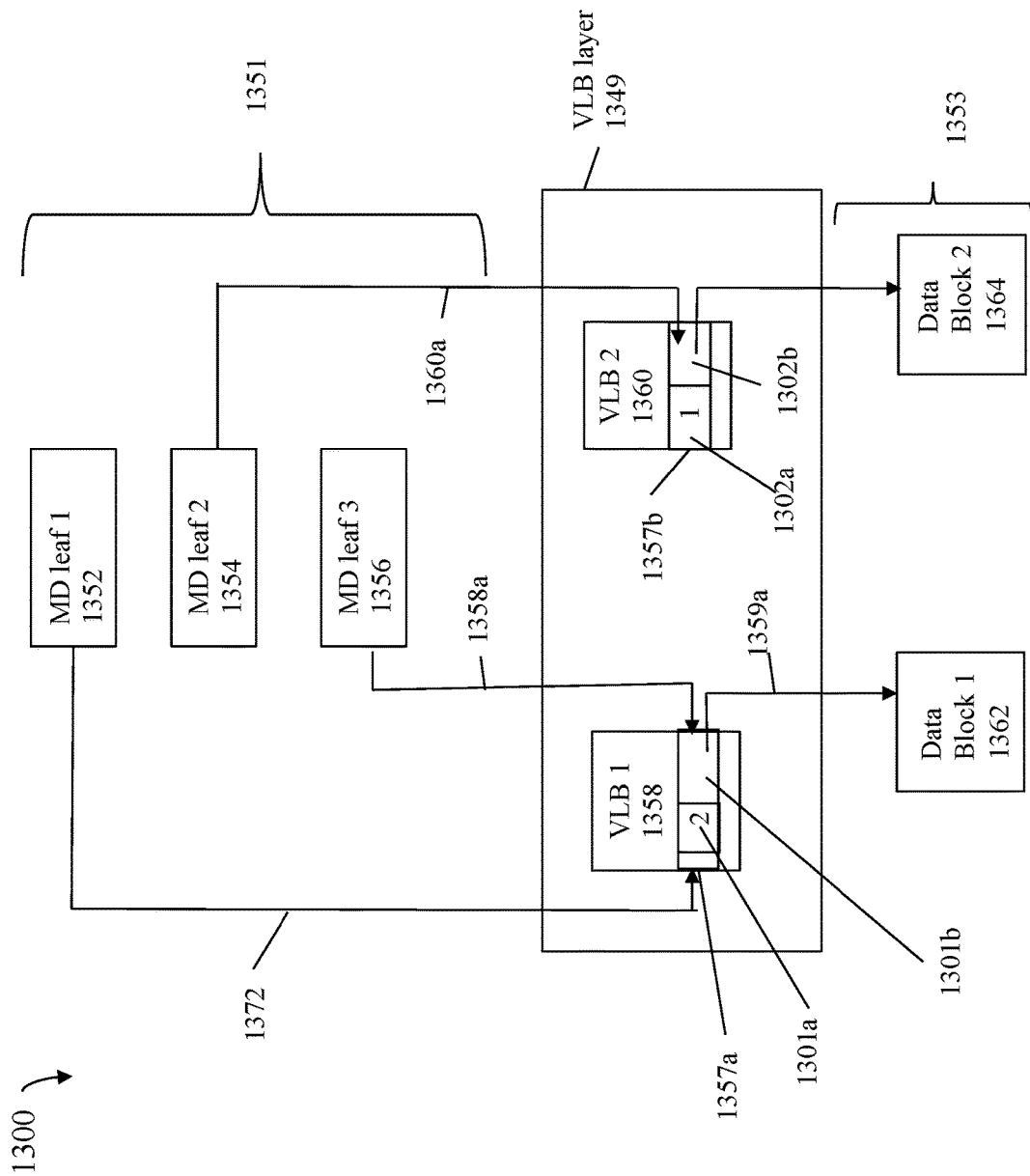

Referring to FIG. 6, shown is an example illustrating in more detail a particular embodiment in which a VLB layer of multiple VLBs is the intervening layer between the MD leaf nodes of the mapping structure 108 and the data blocks. The elements 1352, 1354 and 1356 can denote 3 MD leaf nodes included in a MD leaf layer of a MD mapping structure such as described herein (e.g., in FIGS. 3, 4 and 5). The elements 1358 and 1360 denote 2 VLBs included in the intervening VLB layer 1349 between MD leaf nodes 1351 and data blocks 1353. The elements 1362 and 1364 denote 2 data blocks each storing content such as user data stored at logical addresses. In the example 1300, the MD leaf nodes 1352 and 1356 both indirectly reference the same data block 1362 through the same entry 1357a of the VLB 1358. The two MD leaf nodes 1352 and 1356 both referencing the same data block 1362 indirectly through use of the same VLB entry 1357a can be a mapping resulting from data deduplication processing. In the example 1300, MD leaf node 1354 points to the entry 1357b of the VLB 1360 whereby the entry 1357b of the VLB2 1360 then further references or points to the data block 1364. The data blocks 1362, 1364 can denote user data blocks as described herein.

The element 1358a denotes a pointer to, or address of, the entry 1357a in the VLB 1358 used in connection with obtaining the data block 1362 stored on a particular LUN and LBA of the LUN. The pointer 1358a can be used as the virtual or indirect pointer in connection with obtaining the data block 1362. In at least one embodiment, the VLB 1358 can be a VLB page or node as described herein. Thus, in such an embodiment, the virtual or indirect pointer 1358a can be a pointer to the entry 1357a of the VLB structure 1358, where the entry 1357a can further include fields 1301a and 1301b. The field 1301b can be a pointer to, or address of, the user data block 1362. The field 1301a can be a reference count or counter indicating the number of instances of, or references to, the particular data block 1362 (e.g., data block pointed to by 1301b).

The element 1372 denotes a pointer to, or address of, the entry 1357a in the VLB 1358 used in connection with obtaining the data block 1362 stored on a particular LUN and LBA of the LUN. The pointer 1372 can be used as the virtual or indirect pointer in connection with obtaining the data block 1362. In at least one embodiment, the VLB 1358 can be a VLB page or node as described herein. Thus, in such an embodiment, the virtual or indirect pointer 1372 can be a pointer to the entry 1357a of the VLB structure 1358, where the entry 1357a can further include the fields 1301a and 1301b. The field 1301b can be a pointer to, or address of, the user data block 1362. The field 1301a can be a reference count or counter indicating the number of instances of, or references to, the particular data block 1362 (e.g., data block pointed to by 1301b).

The element 1360a denotes a pointer to, or address of, the entry 1357b in the VLB 1360 used in connection with obtaining the data block 1364 stored on a particular LUN and LBA of the LUN. The pointer 1360a can be used as the virtual or indirect pointer in connection with obtaining the data block 1364. Thus, in such an embodiment, the virtual or indirect pointer 1360a can be a pointer to the entry 1357b of the VLB structure 1360, where the entry 1357b can further include the fields 1302a and 1302b. The field 1302b can be a pointer to, or address of, the user data block 1364. The field

1302a can be a reference count or counter indicating the number of instances of, or references to, the particular data block 1362 (e.g., data block pointed to by 1302b).

The reference count 1301a can be initialized to 1 when a first or initial instance of the associated data block 1362 is stored. In this example, the reference 1301a is 2 indicating that there are 2 instances of the data block 1362 and thus 2 references to the data block 1362. In this case, the are 2 instances of the data block 1362 in stored user data. The instances denoted by the reference count 1301a include all deduplicated instances corresponding to entries of the MDL leaves 1352, 1356 that respectively point 1372, 1358a to the VLB entry 1357a associated with the single copy of the data block 1362.

The reference count 1302a can be initialized to 1 when a first or initial instance of the associated data block 1364 is stored. In this example, the reference 1302a is 1 indicating that there is 1 instance of the data block 1364 and thus 1 reference to the data block 1364. The instances denoted by the reference count 1302a generally include any/all deduplicated instances associated with the single copy of the data block 1364. However, in this example, there is only a single reference to, and single instance of, the data block 1364 in stored user data. In particular, the MD leaf 1354 references or points (1360a) to the VLB entry 1357b associated with the single copy of the data block 1364.

In at least one embodiment, each VLB can be a VLB page or node as described herein including multiple entries, such as 512 entries, where each such VLB entry can include one or more fields of information such as the address or pointer to one of the data blocks such as 1362 or 1364.

In at least one embodiment, each MD leaf can have multiple entries, such as 512 entries, each corresponding to a different logical address in a logical address range corresponding to the MD leaf.

For a read I/O operation received at a node of a dual node system or appliance such as in an active-active configuration, servicing the read operation can include reading one or more data blocks or storage locations as well as reading information from one or more MD pages such as, for example, of the MD or mapping structure as described in connection with FIGS. 3-6.

For a write I/O operation received at a node of a dual node system or appliance such as in an active-active configuration, servicing the write operation can include reading information from one or more MD pages. Servicing the write operation can include updating one or more data blocks or storage locations as well as updating one or more MD pages such as, for example, of the MD or mapping structure as described in connection with FIGS. 3-6.

In at least one embodiment, the MD or mapping information used in connection with stored user data can be stored on non-volatile storage, such as on the BE PDs of the appliance or data storage system. At least some of the MD pages of mapping information for all such user data can be stored in a volatile memory cache of each of the nodes of the appliance or system. Depending on the write operation, one or more logical addresses can be updated with new data or content by a write operation. Additionally, one or more MD pages used to map the one or more logical addresses to one or more physical storage locations storing the new data can also be updated, for example, to reference the one or more physical storage location including the new data or content.

With a log-structured system in at least one embodiment, as recorded writes of the log are processed and flushed or destaged to the BE PDs, the content written by the recorded writes of the log can be stored at new subsequent physical storage locations on the BE PDs. Additionally, the MD or mapping information corresponding to the logged writes being flushed can also be accordingly updated to reference the new subsequent physical storage locations on the BE PDs containing the content. In a dual node appliance or system with an active-active configuration as described herein, both nodes of the system can concurrently receive and service write I/Os, as well as other received requests and commands using shared resources such as, for example, the MD or mapping structure described in connection with the FIGS. 3-6.

In at least one embodiment, updates or modifications to the MD pages of the mapping structure described in connection with the FIGS. 3-6 can also similarly be recorded in entries or records of a persistently stored metadata log and then flushed or destaged from the metadata log to persistent BE storage of the BE PDs. In at least one embodiment, the MD pages of the MD or mapping structure such as described in connection with the FIGS. 3-6 can be persistently stored in a MD page store on the BE PDs of the system. In some contexts herein, the copy of a MD page as stored in the MD page store on the BE PDs can also be referred to herein as the on-disk copy of the MD page.

Workflows for some implementations to perform reads and writes to the MD page can include loading the entire MD page into the cache or volatile memory of a node, if the MD page is not already in the cache or volatile memory of the node.

A data storage system can perform different data services such as data deduplication discussed above to remove redundant or duplicate copies of data or content by storing a single copy of the user data and having multiple references or pointers to the same stored single copy. For example, the content or user data can be stored in a single data block that can be referenced by multiple logical addresses where the content of the data block is stored at all the multiple logical addresses.

In connection with data deduplication, the data block that includes the user data or content can be associated with a MD page, where the MD page can include a reference count denoting the number of references to the data block. For example reference is made back to FIG. 6 and discussion above regarding FIG. 6. In at least one embodiment using the MD structures as described, for example, in connection with FIGS. 3, 4, 5, and 6, the reference count associated with a data block can be included in an entry of a VLB page associated with the data block. For example with reference to FIG. 6, the VLB entry 1357a includes a field 1301a with the reference count=2 for the associated data block 1362; and the VLB entry 1357b includes a field 1301a with the reference count=1 for the associated data block 1364.

The reference count such as of the VLB entries 1357a, 1357b, can be updated in connection with deduplication processing. For example, deduplication processing can be performed on new data written to a target logical address by a write I/O operation. Deduplication processing can determine that the new data is a duplicate of existing data stored in a data block. Rather than store another copy of the same data in another data block, deduplication processing can include alternatively having the target logical address reference the single existing copy of the data as stored in the data block. As part of deduplication processing, the reference count associated with the single existing copy of the data block can be incremented as each additional reference to the same data block is made. In a similar manner, the reference count can be decremented as content of a particular logical address is modified or deleted to no longer be considered a duplicate of the single existing copy of the data block.

Consistent with other discussion herein in at least one embodiment, updates or modifications can be with respect to user data or stored content modified by client or host write I/Os as well as with respect to metadata, such as updates or modifications to the MD structure or mapping information described above. As noted above in at least one embodiment to increase performance, the updates to user data can be stored (e.g., persisted temporarily) in a log or journal logging client or host writes, and the updates to the MD or mapping information can be stored (e.g., persisted temporarily) in a metadata log. One characteristic of a log structured system, such as in connection with the metadata log and log of client updates or writes, is that updates or modifications (which are recorded in an associated log and then flushed to long term storage of the BE PDs) may not physically overwrite or update the same BE PD physical location storing the old data or existing content (e.g., no physical in place update). Rather, the newly written or updated data is typically written to a different physical location on the BE PDs. Thus, the BE PDs can retain the valid old data in the original physical location for some time before being reclaimed for reuse by garbage collection processing.

Garbage collection can be performed in connection with storage management of the BE PDs to reclaim and reuse free or invalidated physical storage as new data is written. In some cases, "holes" of storage storing old, unused or invalid content can be interspersed among portions of storage storing current valid content. Garbage collection can include performing processing which allows multiple holes of storage including unused or invalid data to be compacted into a single larger contiguous storage portion which can then be reused. Thus garbage collection processing can include moving first storage portions of valid data or content interspersed among holes of invalid content from a source to a target location to thereby make free or available a larger contiguous storage portion including the holes of invalid content.

Consistent with other discussion herein, an entry from the log of user or client updates (sometimes referred to as the UD (user data) log) can be an update to a logical address (e.g., LUN and LBA) which writes content to a UD page. Flushing the entry can include destaging the updated UD page to a backend storage location on non-volatile storage (e.g., BE PD location). Additionally, flushing and destaging the entry from the UD log can include updating the corresponding MD pages which map the logical address to its corresponding BE PD location including the content stored at the logical address. In at least one existing system, the mapping information including MD pages as described herein can thus be updated. For example, such updating of the mapping information can include updating any of the top, mid and leaf MD pages used in connection with mapping the logical address to the BE PD location including the content stored at the logical address. In at least one existing implementation, updating the corresponding mapping information and MD pages can include loading all the MD pages into the cache if any such MD pages are not already in cache. The MD pages of the mapping information can be characterized as a chain forming an access sequence of top MD page, mid MD page, and leaf MD page. The mapping information can also include a VLB where a MD leaf page entry can reference a VLB entry, and the VLB entry can reference a physical location on BE non-volatile storage.

Described below are techniques of the present disclosure which provide for improved I/O latency. In at least one embodiment, the techniques of the present disclosure can be used in connection with improving the I/O latency of sequential read I/Os received by a node that does not own the logical addresses to which the read I/Os are directed.

In at least one embodiment, a user data (UD) or client logical address, which can be the target logical address of a client I/O operation such as a read operation, can be uniquely identified using the volume or LUN ID (identifier), or more generally a storage object or resource ID, in combination with the LBA or offset of the logical address.

The techniques of the present disclosure are described below in an exemplary embodiment of a dual node active-active data storage system or cluster where the two nodes are connected by a network link or connection as discussed above. However more generally, the techniques of the present disclosure can be used in connection with a data storage system including more than two nodes, and generally any suitable number of multiple nodes.

Figure 7:
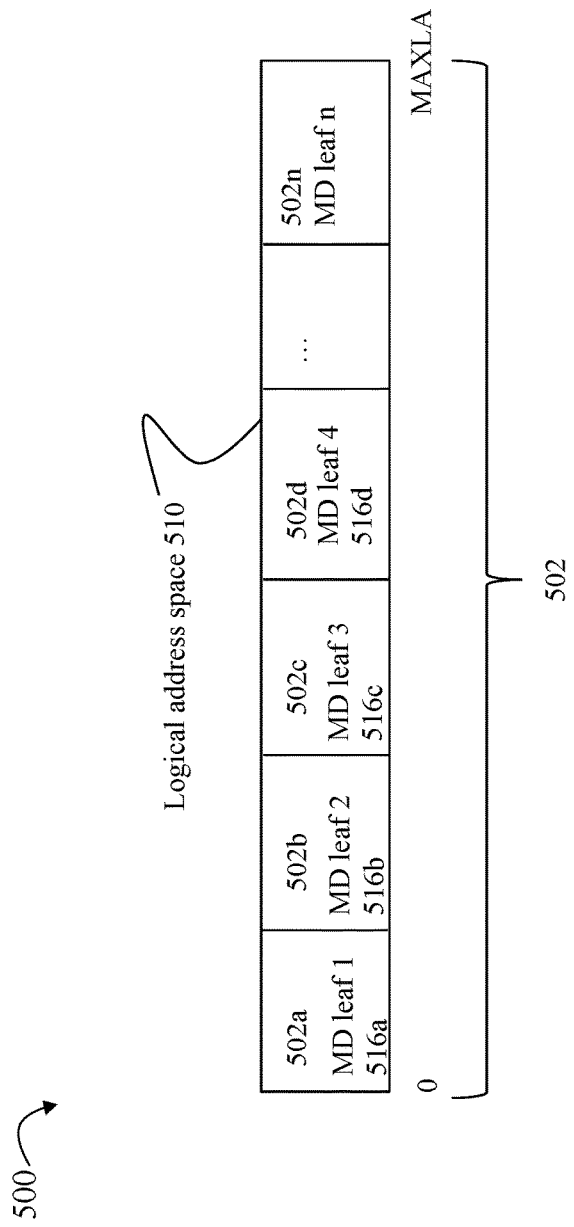
FIG. 7 is an example illustrating a partitioned logical address space in at least one embodiment in accordance with the techniques of the present disclosure.

Referring to FIG. 7, shown is an example 500 illustrating a partitioned logical address space into slices in at least one embodiment in accordance with the techniques of the present disclosure.

The example 500 includes the logical address space 510. The logical address space 510 can denote a contiguous logical address range such as of one or more volumes or LUNs.

In at least one embodiment in accordance with the techniques of the present disclosure, the user data (UD) logical address space 510 can be partitioned into multiple slices or portions 502, such as denoted by multiple logical address slices or portions 502a-n. Each of the logical address slices or portions 502a-n can be a same size, such as 2 MB (megabytes), or any other suitable size. In at least one embodiment, each logical address space portion or slice 502a-n can be 2 MB to correspond to the logical address subrange of each single MD leaf of the MD leaf layer 516. The multiple address space slices or portions 502a-n can then be divided among the two nodes such that a first of the nodes, such as node A, is assigned ownership of a first slice set of the logical address slices or portions 502; and a second of the nodes, such as node B, is assigned ownership of a second slice set of logical address slices or portions 502.

The logical address space 510 can denote an associated logical address space of any one or more storage objects or storage space. The one or more storage objects can include, for example, one or more volumes, logical devices or LUNs; one or more sub-volume or sub-LUN portions; one or more file systems; one or more files; one or more sub-file system portions (e.g., each file system portion being less than an entire file system); and/or one or more vvols or virtual volumes used by one or more virtual machines. Generally, the logical address space 510 can denote a contiguous range of consecutive logical addresses so that each of the logical address slices or portions 502a-n is mapped to a unique subrange of consecutive contiguous logical addresses of the logical address space 510. For example, consider an embodiment where each of the slices or logical address portions 502a-n is 2 MB in size. In this case, the slice 502a can include all logical addresses x in the subrange 0≤x<2 MB (e.g., (0-2 MB]); the portion 502b can include all logical addresses x in the subrange 2 MB≤x<4 MB (e.g., (2 MB-4 MB]); and so on.

The logical address slices or portions 502 can be partitioned into the two slice sets where each slice or logical address portion 502-n is included in only one of the two slice sets. In at least one embodiment, the logical address slices 502 can be partitioned equally as possible between the two nodes A and B although other unequal partitionings can also be suitable for use with the techniques of the present disclosure.

In at least one embodiment, the logical address slices of the contiguous logical address space 510 can alternate in connection with ownership assignment among the nodes A and B. In this manner, ownership of slices or portions of the logical address space 510 can be interleaved among the nodes A and B. For example with reference to FIG. 7 the slices 502a-n can correspond to consecutive contiguous logical address subranges of the logical address space 510, where 0 can denote the starting or lowest logical address of 510 and MAXLA can denote the ending or highest logical address of 510. Assuming each of the slices 502a-n is 2 MB and thus corresponds to a different MD leaf, the first 2 MB subrange (e.g., logical addresses (0 through 2 MB]) of 510 can correspond to the slice 502a; the second 2 MB subrange (e.g., logical addresses (2 MB through 4 MB]) of 510 can correspond to the slice 502b; the third 2 MB subrange (e.g., logical addresses (4 MB through 6 MB]) of 510 can correspond to the third slice 502c; the fourth 2 MB subrange (e.g., logical addresses (6 MB through 8 MB]) of 510 can correspond to the fourth slice 502d, and so on, for each slice in 510.

In at least one embodiment, each slice 502a-n can be assigned a corresponding unique slice identifier or ID which is an integer ID in a consecutive integer sequence corresponding to a relative position in a consecutive and contiguous ordering of the logical address subranges of the slices. For example, the slice 502a has an ID of "1", the slice 502b has an ID of "2", the slice 502c has an ID of "3", and so on, as the associated logical address subranges of the slices increase. In at least one embodiment, ownership of a slice of the logical address space 510 can be derived from or based on the relative consecutive ordering or placement of the slice itself. For example, as noted above, the owner of a logical address slice can be based on whether the slice has an associated even or odd slice ID. In at least one embodiment, all odd slices with odd slice IDs (e.g., slices 516a, 516c, and so on) can be included in a first slice set owned by node A, and all even slices with even slice IDs (e.g., slices 516b, 516d, and so on) can be included in a second slice set owned by node B.

Thus, each logical address of the logical address space or range 510 can be owned by a single one of the nodes A or B.

In at least one embodiment, the techniques of the present disclosure can provide for an improvement in data cache efficiency and an increase in the data cache hit rate in a multiple node system where each of the multiple nodes of the system can receive I/Os and can service such received I/Os.

In at least one embodiment, an architecture can be utilized which partitions ownership of a logical address space of user data or content among the multiple processing nodes of the storage system. For example, the logical address space can correspond to one or more volumes, or more generally, one or more storage objects. The storage objects can include logical devices or volumes, files, file systems, directories, and/or sub-portions of such storage objects.

In at least one embodiment, a node assigned a particular logical address, or a subrange of logical addresses, can be designated as the sole owner, respectively, of the logical address or subrange. In at least one embodiment, a node which owns the logical address can perform address resolution processing (sometimes referred to herein as simply resolution processing) for the logical address using the mapping information of MD pages and can traverse a portion, or at least some, of the chain of MD pages to obtain an IDP (indirect pointer) to the requested read data.

In at least one embodiment, the logical address space can be partitioned or divided into slices where each slice corresponds to a sub-volume logical address portion. In this manner, a volume or logical device, or more generally a storage object, can have an associated logical address space which is partitioned into multiple slices. Each such slice can be assigned to a single one of the nodes as the slice's owner.

In at least one embodiment, the RPC issued by a non-owner node of a logical address to the owner node of the logical address can be a request to perform processing that can use resources which are not owned by the non-owner node issuer or requester of the RPC. Thus in at least one embodiment, the RPC issued by the non-owning node can be made to the owner node to perform an operation on behalf of the non-owning node. In at least one embodiment, the RPC can be a request to perform resolution processing using the mapping information of MD pages. The mapping information can map the logical address to a corresponding physical location on BE non-volatile storage. In at least one embodiment in response to receiving the RPC request, the owning node can perform processing including mapping the logical address owned by the owning node to a corresponding IDP or other pointer or address used to read the content stored at the logical address.

In at least one embodiment, the owner node of a logical address can perform address resolution processing for the logical address using at least some of the MD pages of the mapping information for the logical address.

The foregoing and other aspects of the techniques of the present disclosure are described in more detail in the following paragraphs.

In at least one embodiment, the techniques of the present disclosure provide for reduced read I/O latency such as in connection with consecutive sequential read I/O patterns. In at least one embodiment, the techniques of the present disclosure can provide for data consistency and also provide for improvements in I/O performance in connection with consecutive read I/Os directed to sequential logical addresses where such logical addresses are not owned by the receiving node.

In at least one embodiment, an architecture can be utilized such as described in connection with FIG. 7 which partitions ownership of a logical address space of user data or content among the multiple processing nodes of the storage system. For example, the logical address space can correspond to one or more volumes, or more generally, one or more storage objects. The storage objects can include logical devices or volumes, files, file systems, directories, and/or sub-portions of such storage objects.

In at least one embodiment, a node assigned a particular logical address, or a subrange of logical addresses, can be designated as the sole owner, respectively, of the logical address or subrange. In at least one embodiment, a node which owns the logical address can perform address resolution processing (sometimes referred to herein as simply resolution processing) for the logical address using the mapping information of MD pages and can traverse a portion, or at least some, of the chain of MD pages to obtain an IDP (indirect pointer) to the requested read data.

In at least one embodiment, the logical address space can be partitioned or divided into slices where each slice corresponds to a sub-volume logical address portion. In this manner, a volume or logical device, or more generally a storage object, can have an associated logical address space which is partitioned into multiple slices. Each such slice can be assigned to a single one of the nodes as the slice's owner.

In at least one embodiment, when a read I/O directed to the logical address LA is received by the non-owner node that does not own LA, the non-owner node can issue a remote procedure call (RPC) to the owner node to perform processing including any needed resolution processing using mapping information of MD pages associated with the LA. A node receiving an I/O operation such as the read I/O can sometimes be referred to as an initiator node. In at least one embodiment, when an initiator node receives the read I/O directed to LA not owned by the initiator node, the initiator node can send a request, such as an RPC, to the owning peer node to perform address resolution processing for LA. The peer node which owns LA can perform address resolution processing using the corresponding mapping information for LA. The address resolution processing performed by the owning node can include the owning node using the mapping information of MD pages and traversing a portion or at least some of the chain of MD pages to obtain an IDP to the requested read data of LA. The owning node can return the IDP of the read data to the non-owner initiator node. In turn, the non-owner initiator node can use the IDP to: obtain the requested read data of LA from BE non-volatile storage, and return the read data in response to the received read I/O.

In at least one embodiment, the response returned from the owner node of LA to the non-owner initiator node can additionally include one or more additional IDPs corresponding to one or more additional logical addresses. In at least one embodiment, the logical address LA in combination with the one or more additional logical addresses can form a sequential logical address subrange SUB1. In at least one embodiment, all logical addresses of SUB1 can fall within a defined logical address range R1 that maps to a single corresponding MD leaf. More generally in at least one embodiment, the IDPs or other hints returned in the response can correspond to logical addresses included in R1 of the same MD leaf in order to avoid an additional runtime penalty of accessing an additional MD leaf. Thus, in at least one embodiment, the mapping of one or more IDPs for the one or more additional logical addresses may be obtained without incurring excessive additional processing costs since the same chain of MD pages including the same MD leaf corresponding to LA can generally be used to obtain all the IDPs of R1 of the same MD leaf.

In at least one embodiment, the non-owner initiator node of LA receiving the response can maintain a prefetch hash table (PHT) used to cache or store the one or more additional IDPs of the response corresponding, respectively, to one or more additional LAs of SUB1, or more generally R1 of a single MD leaf page. The PHT can be accessed, indexed or queried using a logical address to obtain a corresponding IDP, if any, is stored in the PHT of the node. Generally in at least one embodiment, each node can maintain a node-local PHT used by that node to store prefetched additional mappings of logical addresses to corresponding IDPs where such logical addresses mapped by the PHT of the node are not owned by the node.

In at least one embodiment, coherency of PHTs on nodes can be maintained by providing notification to a non-owner of LA when a write I/O writing or updating LA is received by the owner node. In at least one embodiment, in response to the non-owner of LA receiving the notification from the owner node regarding the modification or writing to LA, the non-owner node of LA can invalidate or remove a corresponding entry (if any) for LA from the non-owner node's PHT. In response to a non-owner node of LA receiving a write to LA, the non-owner node can invalidate or remove a corresponding entry (if any) for LA from the non-owner node's PHT.

In at least one embodiment, when a read I/O directed to LA is received by a node that does not own LA, the receiving initiator node can first query its local PHT to determine whether there is a corresponding entry in the initiator node's local PHT for LA. If there is an entry in the PHT of the non-owner initiator node for LA, the PHT entry can map LA to a corresponding IDP. In this manner, if there is a PHT entry in the initiator node for LA, the initiator node can use the corresponding IDP of the PHT entry to read content C1 stored at LA from BE non-volatile storage, and then return C1 in response to the read I/O. If there is no such PHT entry for LA in the initiator node's PHT, then the initiator node can issue a request to the owner peer node to perform resolution processing for LA. The owner node can return a response to the initiator node, where the response can include the IDP for LA along with one or more additional IDPs corresponding to one or more additional logical addresses (LAs). In at least one embodiment, LA and the one or more additional LAs can be included in SUB1 denoting the same consecutive sequential address subrange. More generally in at least one embodiment, the response can return the IDP for LA and one or more additional IDPs for one or more additional logical addresses included in R1, where R1 denotes a logical address range associated with a single MD leaf. The non-owner initiator node can store, in its PHT, one or more PHT entries for the one or more additional IDPs for one or more additional logical addresses returned in the response, where each of the one or more PHT entries can map one of the additional logical addresses to a corresponding one of the additional IDPs of the response.

In at least one embodiment, the mapping information can include a multi-level tree or hierarchical structure of MD pages. In at least one embodiment, the number of levels in the tree or structure can be three or more. In at least one embodiment, the tree can be a B+ tree data structure where each non-leaf node can include up to N children. Thus N can be a specified maximum allowable number of child nodes and N can be 2 or more.

In at least one embodiment in which the mapping information includes a 3 level tree of MD pages, each slice, which is owned by one of the nodes, can correspond to a logical address space subrange associated with a MD leaf page of the tree. The tree can also include a mid MD page level of mid MD pages and a top MD page level of top MD pages. Each mid MD page can include addresses of, or pointers to, MD leaf pages. Each top MD page can include addresses of, or pointers to, MD mid pages.

In at least one embodiment, the storage system can include two nodes and a logical address space can be partitioned into two sets of slices, where each slice set is owned by only a single one of the nodes. The logical address space can be partitioned into consecutive slices which correspond to consecutive, contiguous sequential logical address subranges of the logical address space. The slices can be assigned a unique integer identifier or ID such as beginning with one (1), where even slices can be included a first slice set owned by node A, and where odd slices can be included in a second slice set owned by node B. Each slice can correspond to a logical address subrange size such as 2

MBs. In at least one embodiment, each MD page of the tree of mapping information can include 512 entries, where each entry is a pointer or address. Each non-leaf MD page entry can be a pointer to, or address of, another MD page. Each leaf MD page entry can be a pointer to, or address of, an entry in a VLB (virtual layer block) page. In such an embodiment where each MD leaf corresponds to a 2 MB logical address space portion, each MD leaf entry can correspond to a 4K page of content or stored user data. Each MD leaf entry can include the address of a VLB entry, where the VLB entry further includes another pointer to or address of non-volatile storage containing the content or user data.

In at least one embodiment, the IDP can be a hint or address hint for a logical address LA. In at least one embodiment, the IDP can be a pointer or reference to, or an index or address of, a VLB entry of a VLB. The VLB entry can further include an address of, or a pointer to, a PLB (physical layer or large block) on BE non-volatile storage where the content of the LA is stored. More generally, the IDP can be characterized as, or can denote, a hint used by the non-owner node to retrieve content for LA from BE non-volatile storage.

In at least one embodiment, the IDP for a logical address can be a pointer or reference to, or an index or address of, a VLB entry as noted above. As a variation rather than use an IDP such as a pointer to, or address of, a VLB entry, an embodiment can more generally use other suitable types of address hints or hints where such a hint can be used by a non-owner node to access or obtain valid current content stored at a logical address. For example, in at least one embodiment, the hint for a logical address can be a pointer to the PLB of BE non-volatile storage storing the current valid content for the logical address.

In at least one embodiment, when a read I/O directed to logical address LA is received at a node that does not own LA, the receiving node can send an RPC request to the owner node of LA to map or perform address resolution processing for LA. In the RPC response in at least one embodiment, the owner node can generally include the IDP for LA and can also include a set of extra mappings. In at least one embodiment, the set of extra mappings of the RPC response can include one or more IDPs corresponding to one or more consecutive sequential logical addresses with respect to LA. For example, the set of IDPs can correspond to a specified or predefined number of logical addresses which are consecutive and sequential with respect to LA. For example, the logical addresses for the set of extra mappings of IDPs included in the RPC response can correspond to logical addresses LA+1, LA+2, LA+3, and so on, for a specified number of consecutive sequential logical addresses. In at least one embodiment each IDP can be a VLB pointer such as a pointer to a VLB entry of a VLB page. In at least one embodiment, the IDP for LA as included in the RPC response along with all IDPs of the set included in the RPC response can be associated with the same MD leaf page. For example, in at least one embodiment, all IDPs included in the RPC response can be pointers or addresses of VLB entries, where such pointers or addresses are included in entries of the same MD leaf.

In at least one embodiment, a non-owner initiator node can maintain a PHT of extra mappings received in RPC responses from the owner node. In at least one embodiment, the PHT can include entries where each entry denotes a logical address-IDP pair. The PHT can be indexed by logical address such that a logical address can be used as a key to perform a lookup or query of the PHT and determine whether the PHT includes a corresponding entry for a specified logical address LA. When the non-owner initiator node is processing a received read I/O directed to LA, the initiator node can first query its local PHT for a corresponding IDP for LA. If there is such an entry in the initiator node's PHT for LA, the initiator node can use the IDP of the matching entry for LA to read content C1 stored at LA from BE non-volatile storage. Alternatively, if there is no entry in the initiator node's PHT for LA, the non-owner initiator node can send an RPC request to the owner node for LA to perform mapping or address resolution processing for LA and return an RPC response which includes the IDP for LA along with the extra mappings or set of one or more additional IDPs for one or more consecutive sequential logical addresses with respect to LA. In at least one embodiment, the initiator node can store PHT entries for the extra mappings or set of one or more additional IDPs included in the RPC response. Each node can maintain its own node local PHT for logical addresses not owned by node.

In at least one embodiment, entries from the PHT table of a node can be removed when corresponding logical addresses are overwritten or otherwise preempted for reuse by storing fresher more recently received extra mappings.

In at least one embodiment, PHT coherency of a node can be guaranteed by providing the node with a notification when a logical address LA not owned by the node is updated or overwritten thereby invalidating any existing entry for LA in the PHT of the node. In at least one embodiment, the foregoing notification can be provided to the non-owner node with respect to LA in response to the peer owner node of LA receiving a write I/O that writes to LA. The notification can be sent as part of processing in connection with logging the write I/O in a log, such as a log used for recording write I/Os for user data or content. Generally, any suitable mechanism can be used to provide the non-owner node of LA a notification regarding the update, modification or write to LA by an operation, such as a write I/O operation, received and serviced by the owner node of LA. In at least one embodiment, logging or processing a write I/O directed to LA, such as where the write I/O is received by the owner node, can include the owner node of LA logging the write in its own local persistent memory and also mirroring the logging of the write in second persistent memory of its peer node. In at least one embodiment, the foregoing mirroring by the owner node can be performed using Remote Direct Memory Access or RDMA commands to directly access and log the write in memory of the peer node (which does not own LA). In at least one embodiment, the notification regarding the mirroring can be sent to the peer node in parallel with the updating or logging of the write I/O in the non-owner peer node's memory. As a variation, an embodiment can send the notification immediately prior to performing the updating or logging of the write I/O in the non-owner peer node's memory to mirror logging of the write I/O. In at least one embodiment, the notification can be a callback or RPC issued either explicitly by software in parallel with mirroring and logging the write I/O. In at least one embodiment, the notification can be a callback or RPC issued as part of RDMA acknowledgment. In any case, once the non-owner node receives the notification regarding the update, write or modification of LA, processing can be performed by the non-owner node of the LA to remove any corresponding entry for LA from the non-owner node's PHT.

In at least one embodiment, each PHT entry can be included in a list associated with an index I. Each PHT entry can include the following 3 fields of information: 1) a logical address LA; 2) a hint or address hint that is an IDP such as a VLB pointer (e.g., an address of a VLB entry of a VLB page); and 3) a link (e.g., pointer, address or reference) to the next entry, if any, in the list associated with the index I. In at least one embodiment for an existing entry of a list associated with a PHT index, if there is no next entry, the link field of the existing entry can be null. The PHT entries can be stored and accessed in the PHT using an LA as the key.

Figure 8A:
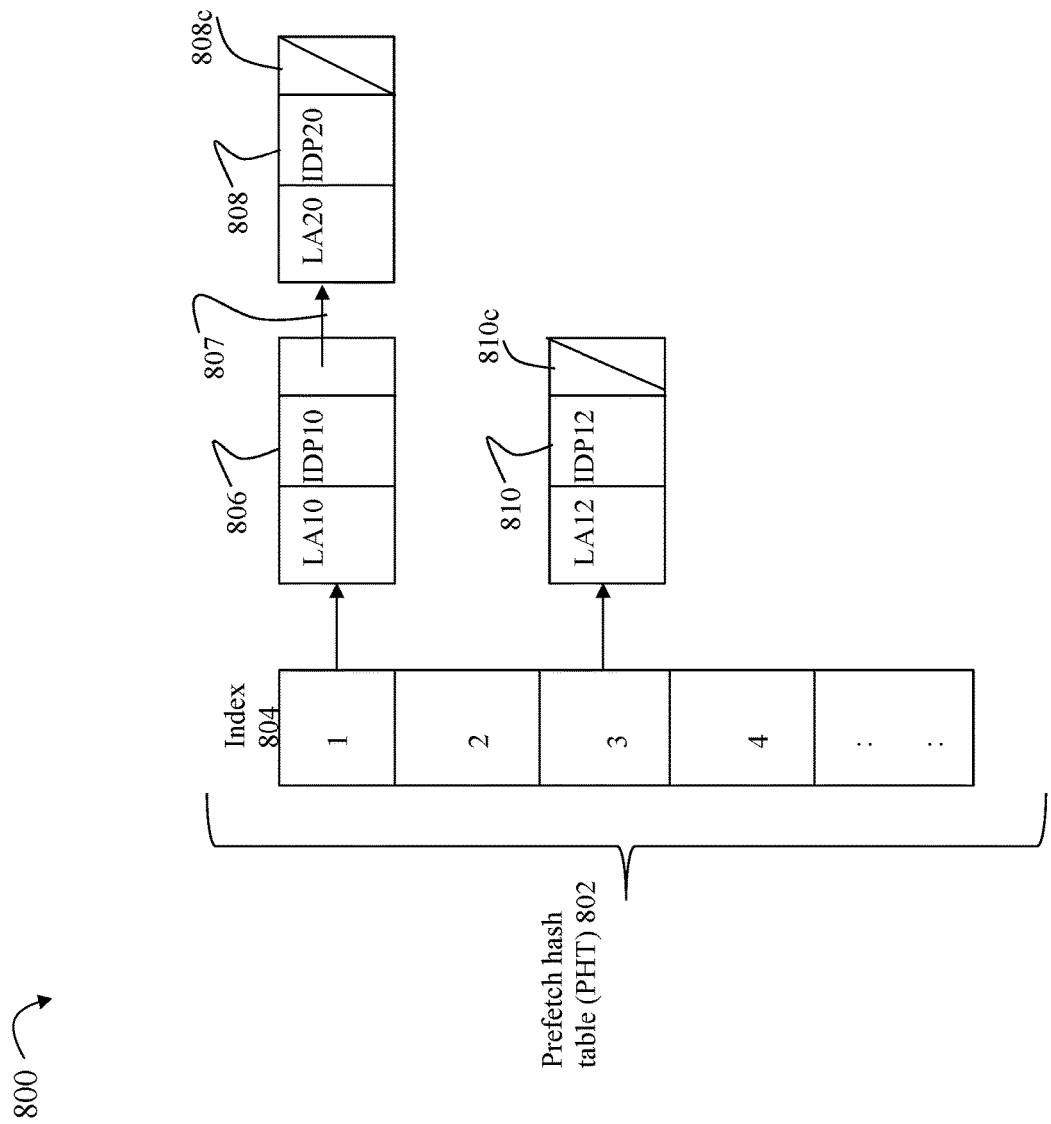
FIGS. 8A, 8B and 9 are examples illustrating structures that can be used in at least one embodiment in accordance with the techniques of the present disclosure.

Referring to FIG. 8A, shown is an example 800 of a PHT 802 in at least one embodiment in accordance with the techniques of the present disclosure.

An instance of the PHT 802 can be stored and maintained on each node. In at least one embodiment, each instance of the PHT can be stored in node local memory, such as volatile memory, of each node. Consistent with discussion herein, the PHT of a node can be used to store LA-IDP pairs for LAs not owned by the node. The LAs can denote logical addresses of user data or content each expressed in one embodiment as a LUN or volume ID and an LBA or logical offset within the LUN or volume.

In at least one embodiment, each PHT can be accessed using an LA as a key, where the LA can be provided as an input to a hash function H that generates a corresponding hash value HV. The foregoing can be represented as H(LA)-HV, where HV can be mapped to a particular value of index I 804 of the PHT 802. In at least one embodiment, the HV can be used as the value of the index I 804 whereby the HV identifies an index of the PHT 802 which may be associated with a corresponding entry E for LA.

In at least one embodiment, multiple LAs can be hashed or mapped to the same index I 804 such that zero or more entries can be associated with each index I of the PHT 802. Thus each index value of I of the PHT can be associated with a bucket of zero or more entries. Each PHT entry can denote a single LA-IDP mapping stored in the PHT of the node. In at least one embodiment, each index I of the PHT can have a list of associated entries for LAs which hash or map to the particular index value of I. In at least one embodiment, the list of entries associated with each index value of I can be linked list. For example, the index value I 804=1 includes two entries 806 and 808. Entry 806 denotes an entry for the logical address LA10 and its corresponding IDP, IDP10. Entry 808 denotes an entry for the logical address LA20 and its corresponding IDP, IDP20. Entry 806 is linked to entry 808 by the pointer 807 stored in the entry 806. Because there is no next entry subsequent to entry 808 in the list associated with index I=1, the link field 808c of entry 808 is null.

As illustrated in FIG. 8A, the index I=3 is associated with a bucket or list of a single entry 810 for the logical address LA12 and its corresponding IDP, IDP12. Because there is only a single entry 810 associated with index I=3, the link field 810c of entry 810 is null.

As illustrated in the FIG. 8A, there are no entries associated with index values of 2 and 4.

During processing, an entry for an LA can be added to the PHT by computing H(LA)-HV, where HV is mapped to a corresponding index value of I. In at least one embodiment, the new entry can be added to the bucket or list of entries associated with index I such as by adding the entry to the front of the list or adding the entry to the end of the list. In a similar manner, an entry can be removed from the PHT by removing the entry from the bucket or list associated with a particular index value of I. In at least one embodiment, removing entries from lists and adding entries to lists can be performed by in a suitable straightforward manner such as by modifying existing pointers. For example, entry 810 can be removed from the list associated with index I=3 by unlinking the entry 810 from the index I=3.

Figure 8B:
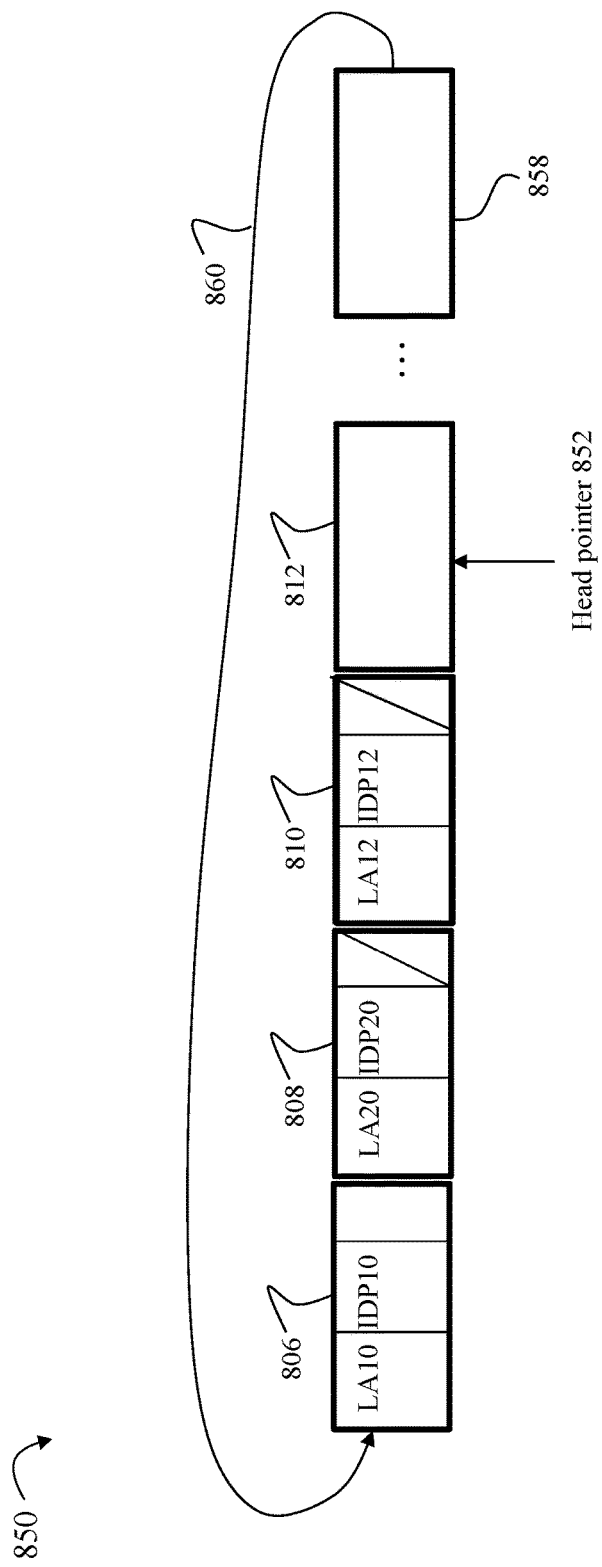

In at least one embodiment, PHT entries can be allocated from an array of prefetch entries as illustrated in the example 850 of FIG. 8B. When a new PHT entry is needed, it can be allocated from the array of entries. In at least one embodiment, the array of entries can be organized as a ring buffer where entries are allocation from the head position as denoted by the head pointer 852. As illustrated, the entries 806, 808 and 810 from FIG. 8A can correspond respectively to the first 3 allocated entries of the array, where the head pointer 852 can point to the next array entry 812 to be allocated. If entry 812 pointed to by head pointer 852 is currently stored in the PHT, the entry 812 can be first removed or evicted from the PHT before being reused (e.g., reallocated and updated). Once entry 812 has been reallocated and updated to include a new LA-IDP pair, the updated entry 812 can then be added to a corresponding list associated with an index value of I in accordance with the new LA-IDP pair. Once entry 812 is allocated or reused, the head pointer 852 can be advanced or forwarded to the next entry in the list. In this example, as entries from the array of prefetch entries are allocated, the head pointer 852 can keep advancing to the next entry to the right until the end or last entry 858 of the array is reached. Subsequently, the head pointer 852 can advance in the direction of arrow 860 to the starting entry of the array in accordance with management of the array 850 as a logically managed ring structure. In at least one embodiment, no explicit reclamation operation is needed with the array of entries. According to the allocation strategy outlined above in at least one embodiment, the "oldest" entry located at the head (as pointed to by head pointer) can be allocated and reused. The foregoing management of the array 850 is also based on a least recently used (LRU) policy where the array can generally store the set of the most recent entries, and the oldest or least recently used entry of the array can be the next entry that is evicted and reallocated or reused.

In at least one embodiment, the particular size of the array of entries can be vary with embodiment. In at least one embodiment, the size or number of entries in the array of FIG. 8B can be based, at least in part, on the average number of LAs read by storage client read I/Os within a specified time period. In at least one embodiment, the size or number of entries in the array of FIG. 8B can be based, at least in part, on the average number of LAs read by storage client read I/Os within a time period denoting a selected value in the inclusive range of 0.5 seconds and 2 seconds (e.g., time period can denote an amount of time between 0.5 second and 2 seconds).

Entries can be added to the PHT of a non-owner node when the non-owner node receives a read I/O directed to an LA not owned by the receiving or initiator node. In response the non-owner node sends an RPC request to perform address resolution processing to map the LA to the owner node. In response to the RPC request, the owner node can map LA to its corresponding IDP. Additionally, the foregoing can mapping behavior can be extended to extra or additional mappings so that the owner maps the request LA and one or more additional LAs such as LA+1, LA+2, . . . LA+N, where "N" can denote the number of additional or extra LAs mapped to corresponding IDPs. In at least one embodiment, N can be any suitable integer value of 1 or more. The particular value of N selected can vary with embodiment. In at least one embodiment, the value for N denoting the number of extra mappings or additional LAs for which corresponding IDPs are included in the RPC response can be in the range of 4 to 16. In at least one embodiment, all mapped LAs associated with a single RPC request and response should be inside the aligned 2 MB range, i.e., covered by the same single MD Leaf page, to avoid a penalty of accessing additional Leaf for prefetch purpose. Thus, mapping of N additional LAs is not associated with any essential extra processing cost. The RPC response can include an IDP corresponding to the target LA of the read I/O and can also include the N IDPs for the N additional LAs which are included in the same predefined 2 MB range as the LA of the read I/O. In at least one embodiment, the LA and the N additional LAs can form a consecutive sequential subrange SUB1 of logical addresses falling within the same 2 MB aligned logical address range. In this manner, the owner node can be characterized as prefetching the N IDPs for the next subsequent sequential consecutive N LAs of SUB1. To further illustrate, reference is made back to FIGS. 3, 4, 5 and 6 where a single MD leaf page can include 512 entries. Thus, the single MD leaf page can include 512 entries each of which is a pointer, address or reference to a VLB entry for a different LA in the 2 MB LA range associated with the single MD leaf page. Each such pointer, address or reference to a VLB entry can be an IDP used to access or read content stored at a particular logical address from a physical storage location on BE non-volatile storage. In at least one embodiment, the RPC response can include a first pointer PTRI to a VLB entry for the target LA of the read I/O. Additionally, the RPC response can include N additional pointers for N additional LAs, where the N additional LAs can be consecutive sequential LAs and such N additional LAs can be consecutive sequential LAs with respect to the target LA. In at least one embodiment, each of the additional N pointers can be a pointer to a VLB entry. In at least one embodiment, the owner node of LA can also own the N additional LAs. In at least one embodiment, the owner node of LA can own all logical addresses in the 2 MB range associated with the single MD leaf where LA and the N additional LAs are included in the 2 MB range associated with the single MD leaf.

Responsive to receiving the RPC request, the owner node can send the RPC reply or response including the IDP for the requested LA and also the prefetched N IDPs for the N additional mapped LAs to the initiator node. The initiator node receives the RPC reply or response and can 1) allocate and fill PHT entries for all prefetched N LAs; 2) add such PHT entries for the N prefetched LAs and IDPs to the initiator node's PHT; and 3) perform processing for the target LA of the read I/O using the IDP returned for the target LA. In at least one embodiment, such processing can include the initiator node 1) using the IDP corresponding to the LA of the read I/O to read content C1 stored at LA from back-end non-volatile storage; and 2) returning C1 in response to the read I/O.

Figure 9:
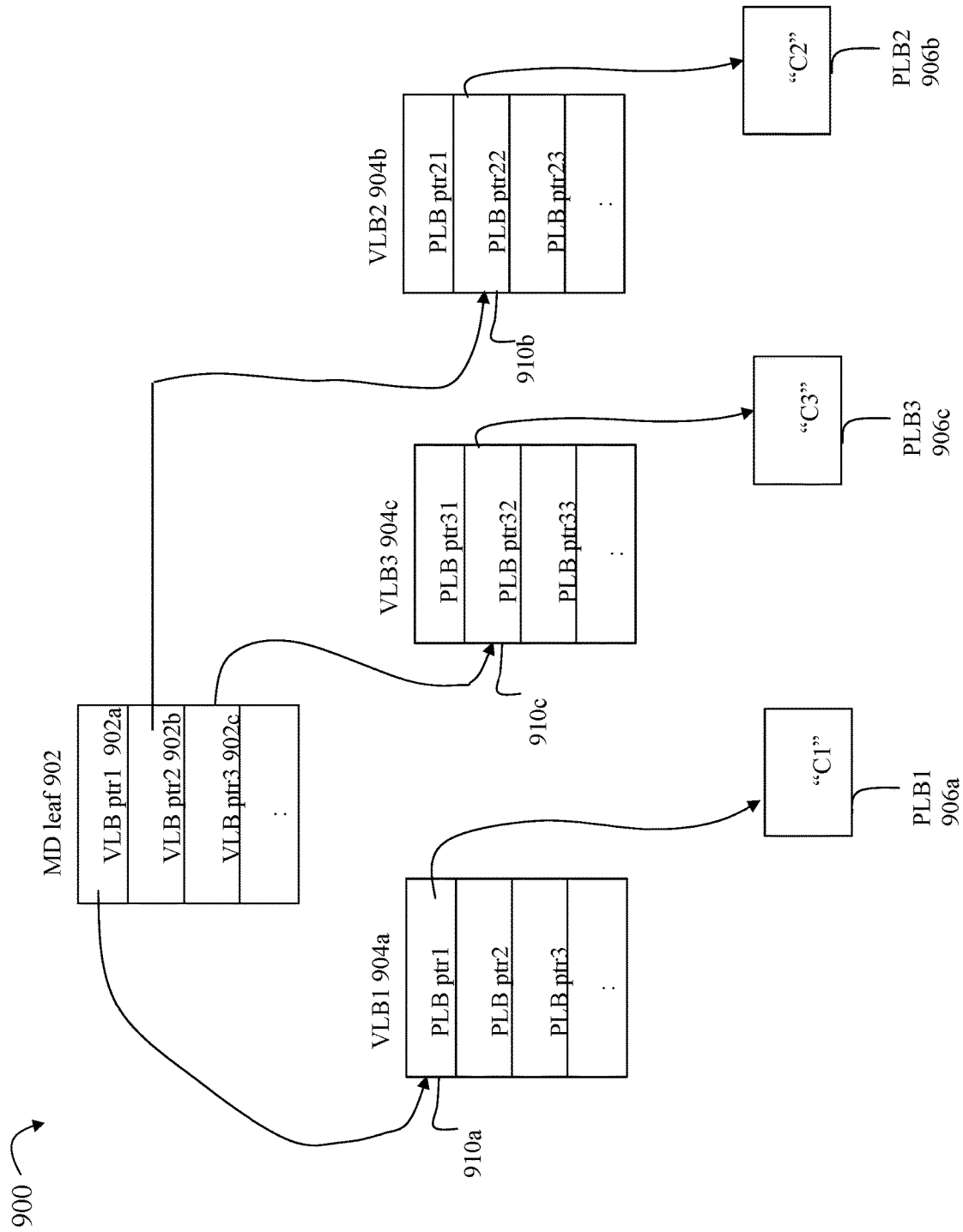

Referring to FIG. 9, shown is an example 900 illustrating returned IDP pointers of an RPC response in at least one embodiment in accordance with the techniques of the present disclosure.

The example 900 includes only MD leaf 902, VLB pages 904a-c and PLBs 906a-c for purposes of simplicity of illustration. Generally, the mapping information of MD pages includes other MD pages as discussed elsewhere herein such as in FIGS. 3, 4, 5 and 6. Assume that the entry 902a of the MD leaf 902 is included in the mapping information for the target LA of the read I/O operation. Additionally, the entry 902b of the MD leaf 902 can be included in the mapping information for the logical address LA+1; and the entry 902c of the MD leaf 902 can be included in the mapping information for the logical address LA+2. Assume N=2 such that the RPC response includes 2 prefetched, additional or extra mappings of LAs to IDPs where such additional 2 LAs in combination with the target LA form a consecutive sequential I/O pattern of logical addresses (e.g., LA, LA+1, LA+2, where LA is the target LA of the read I/O, and where LA+1 and LA+2 are the 2 LAs for which corresponding IDPs are prefetched). In this case, the RPC response can include VLBptr1 902a corresponding to the target LA of the read I/O where VLB ptr1 902a is an address of, or pointer to, VLB entry 910a of VLB1 904a. The RPC response can also include: VLBptr2 902b corresponding to the LA+1; and can also include VLBptr3 902c corresponding to LA+2. VLBptr2 902b can be an address of, or pointer to, VLB entry 910b of VLB2 904b. VLBptr3 902c can be an address of, or pointer to, VLB entry 910c of VLB3 904c. The addresses or pointers VLBptr1 902a, VLBptr2 902b and VLBptr3 902c can all be IDPs used to access content of corresponding LAs (e.g., LA, LA+1 and LA+2) as stored at physical storage locations on BE non-volatile storage. In particular VLB ptr1 902a points to VLB entry 910a which includes the address or pointer PLB ptr1 to the physical storage location PLB1 906a including the content C1 stored at the target LA. VLB ptr2 902b points to VLB entry 910b which includes the address or pointer PLB ptr22 to the physical storage location PLB2 906b including the content C2 stored at LA+1. VLB ptr3 902c points to VLB entry 910c which includes the address or pointer PLB ptr32 to the physical storage location PLB3 906c including the content C3 stored at LA+2.

In response to an initiator node receiving the foregoing RPC response, the initiator node can use VLBptr1 902a to retrieve content C1 stored at the read I/O target LA and return C1 in response to the read I/O. Additionally, the initiator node can create 2 new PHT entries for the two prefetched IDPs—VLB ptr2 902b and VLB ptr3 902c—where a first of the newly added PHT entries includes a mapping for LA+1 to its corresponding IDP, VLB ptr2 902b; and where a second of the newly added PHT entries includes a mapping for LA+2 to its corresponding IDP, VLB ptr3 902c.

What will now be described are flowcharts of processing steps that can be performed in at least one embodiment in accordance with the techniques of the present disclosure. The flowcharts summarize processing discussed above.

Figure 10A:
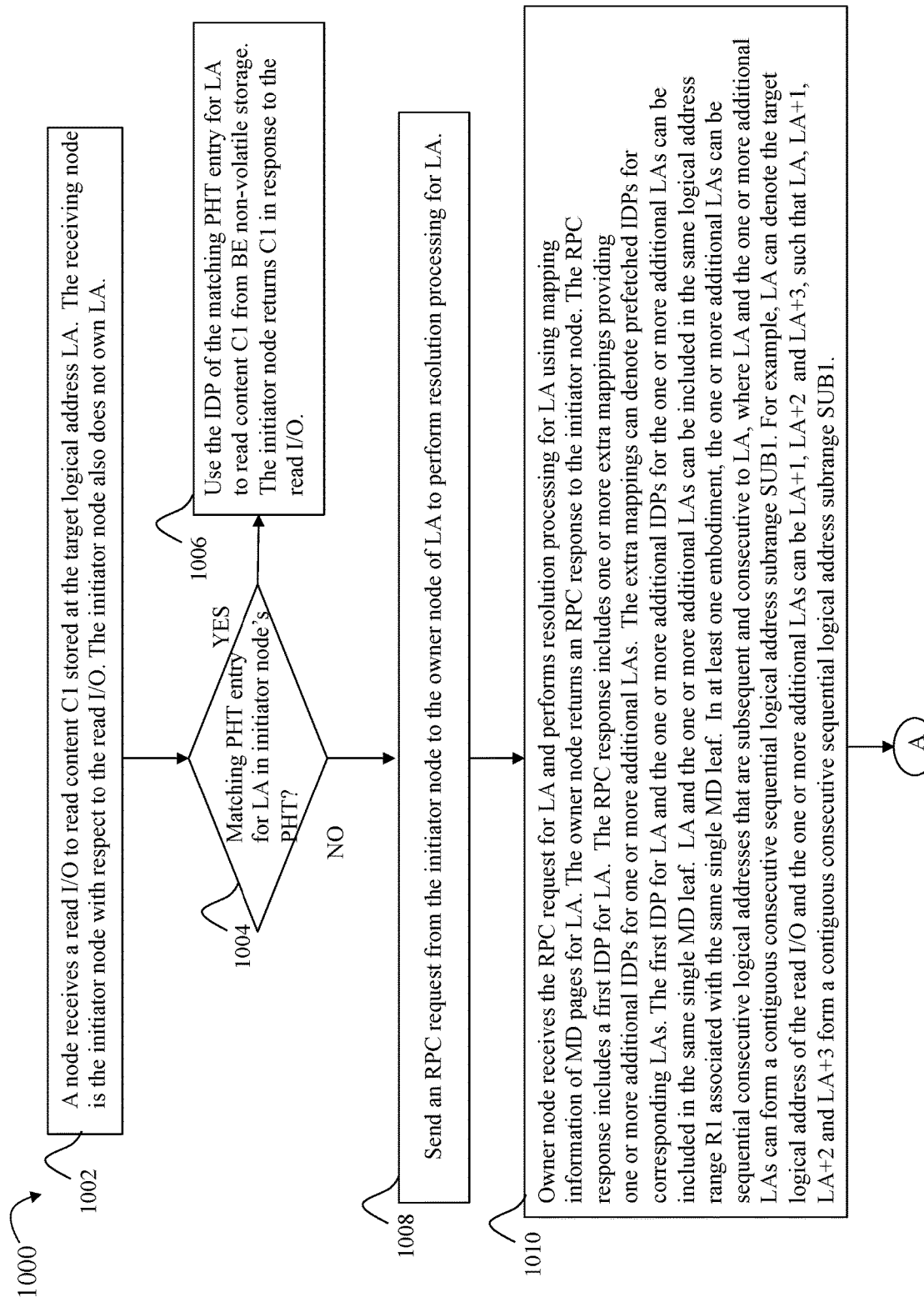
FIGS. 10A, 10B, 11 and 12 are flowcharts of processing steps that can be performed in at least one embodiment in accordance with the techniques of the present disclosure.
Figure 10B:
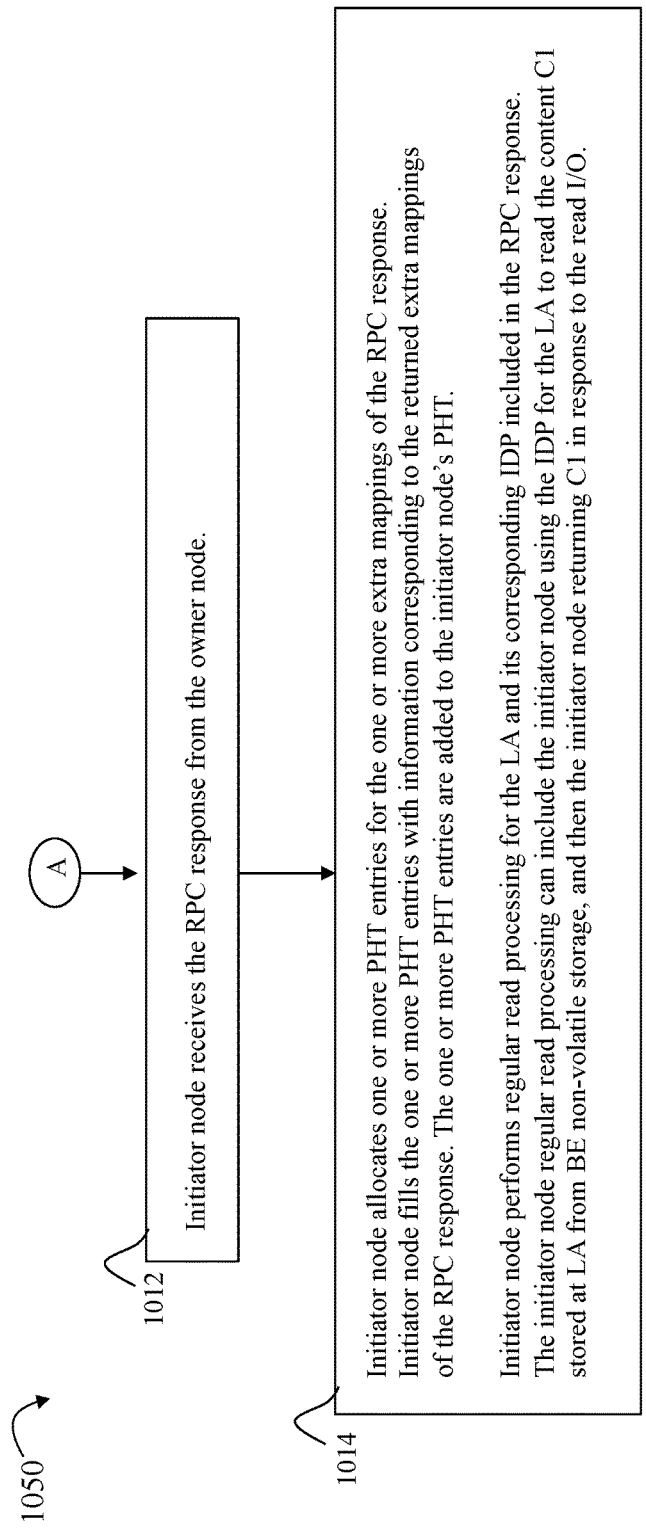

Referring to FIGS. 10A and 10B, shown is a flowchart 1000, 1050 of processing steps that can be performed in connection with a read I/O received by a non-owner node in at least one embodiment in accordance with the techniques of the present disclosure.

At the step 1002, a node receives a read I/O to read content C1 stored at the target logical address LA. The receiving node is the initiator node with respect to the read I/O. The initiator node also does not own LA. From the step 1002, control proceeds to the step 1004.

At the step 1004, the initiator node determines whether there is a corresponding or matching PHT entry for LA in the initiator node's PHT. If the step 1004 evaluates to yes, control proceeds to the step 1006.

At the step 1006, the initiator node uses the IDP of the matching PHT entry for LA to read content C1 from BE non-volatile storage. The initiator node returns C1 in response to the read I/O.

If the step 1004 evaluates to no, control proceeds to the step 1008. At the step 1008, the initiator node sends an RPC request from the initiator node to the owner node of LA to perform resolution processing for LA. From the step 1008, control proceeds to the step 1010.

At the step 1010, the owner node of LA receives the RPC request for LA and performs resolution processing for LA using mapping information of MD pages for LA. The owner node returns an RPC response to the initiator node. The RPC response includes a first IDP for LA. The RPC response includes one or more extra mappings providing one or more additional IDPs for one or more additional LAs. The extra mappings can denote prefetched IDPs for corresponding LAs. The first IDP for LA and the one or more additional IDPs for the one or more additional LAs can be included in the same single MD leaf. LA and the one or more additional LAs can be included in the same logical address range R1 associated with the same single MD leaf. In at least one embodiment, the one or more additional LAs can be sequential consecutive logical addresses that are subsequent and consecutive to LA, where LA and the one or more additional LAs can form a contiguous consecutive sequential logical address subrange SUB1. For example, LA can denote the target logical address of the read I/O and the one or more additional LAs can be LA+1, LA+2 and LA+3, such that LA, LA+1, LA+2 and LA+3 form a contiguous consecutive sequential logical address subrange SUB1. In at least one embodiment, the LA and the one or more additional LAs associated with the same single MD leaf can be owned by the same owner node. From the step 1010, control proceeds to the step 1012.

At the step 1012, the initiator node receives the RPC response from the owner node. From the step 1012, control proceeds to the step 1014.

At the step 1014, the initiator node allocates one or more PHT entries for the one or more extra mappings of the RPC response. The initiator node fills the one or more PHT entries with information corresponding to the returned extra mappings of the RPC response. The one or more PHT entries are added to the initiator node's PHT.

Also in the step 1014, the initiator node performs regular read processing for the LA and its corresponding IDP included in the RPC response. The initiator node regular read processing can include the initiator node using the IDP for the LA to read the content C1 stored at LA from BE non-volatile storage, and then the initiator node returning C1 in response to the read I/O.

Figure 11:
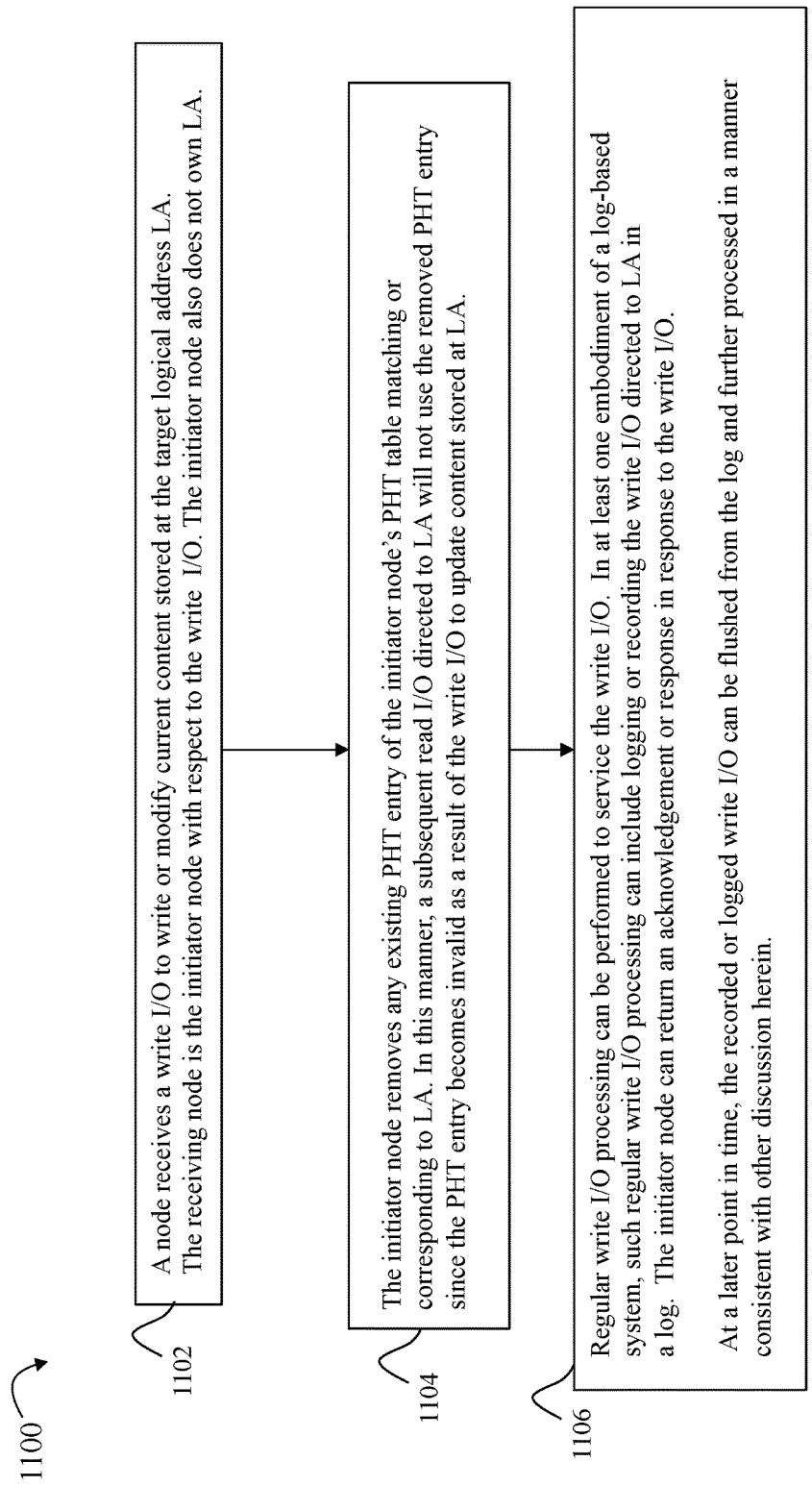

Referring to FIG. 11, shown is a flowchart 1100 of processing steps that can be performed in connection with a write I/O received by a non-owner node in at least one embodiment in accordance with the techniques of the present disclosure.

In a step 1102, a node receives a write I/O to write or modify current content stored at the target logical address LA. The receiving node is the initiator node with respect to the write I/O. The initiator node also does not own LA. From the step 1102, control proceeds to the step 1104.

At the step 1104, the initiator node removes any existing PHT entry of the initiator node's PHT table matching or corresponding to LA. In this manner, a subsequent read I/O directed to LA will not use the removed PHT entry since the PHT entry becomes invalid as a result of the write I/O to update content stored at LA. From the step 1104, control proceeds to the step 1106.

At the step 1106, regular write I/O processing can be performed to service the write I/O. In at least one embodiment of a log-based system, such regular write I/O processing can include logging or recording the write I/O directed to LA in a log. Once the write I/O has been recorded in the log, the initiator node can return an acknowledgement or response in response to the write I/O. At a later point in time, the recorded or logged write I/O can be flushed from the log and further processed in a manner consistent with other discussion herein.

Figure 12:
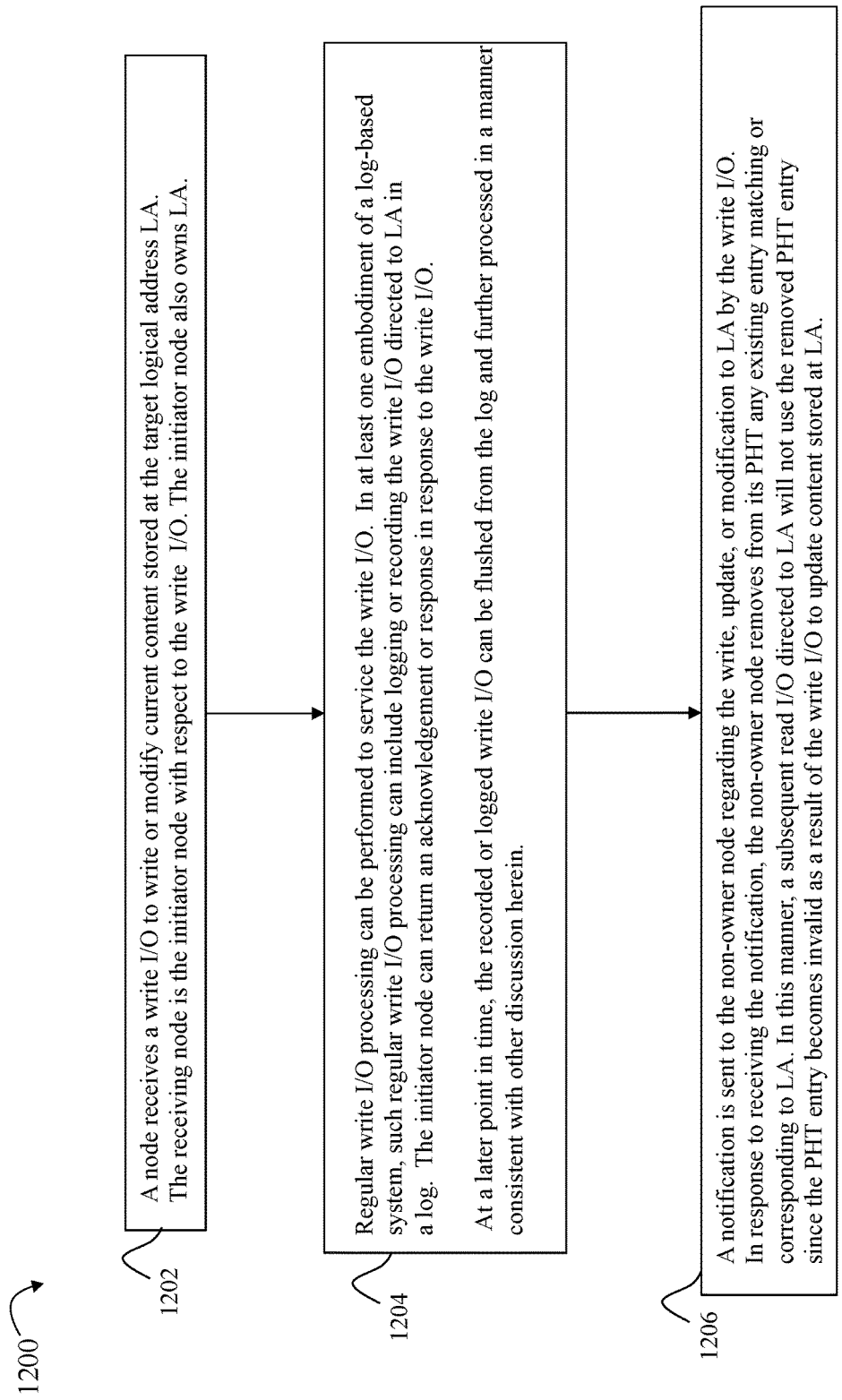

Referring to FIG. 12, shown is a flowchart 1200 of processing steps that can be performed in connection with a write I/O received by an owner node in at least one embodiment in accordance with the techniques of the present disclosure.

At a step 1202, a node receives a write I/O to write or modify current content stored at the target logical address LA. The receiving node is the initiator node with respect to the write I/O. The initiator node also owns LA. From the step 1202, control proceeds to the step 1204.

At the step 1204, regular write I/O processing can be performed to service the write I/O. In at least one embodiment of a log-based system, such regular write I/O processing can include logging or recording the write I/O directed to LA in a log. Once the write I/O has been recorded in the log, the initiator node can return an acknowledgement or response in response to the write I/O. At a later point in time, the recorded or logged write I/O can be flushed from the log and further processed in a manner consistent with other discussion herein. From the step 1204, control proceeds to the step 1206.

At the step 1206, a notification is sent to the non-owner node regarding the write, update, or modification to LA by the write I/O. In response to receiving the notification, the non-owner node removes from its PHT any existing entry matching or corresponding to LA. In this manner, a subsequent read I/O directed to LA will not use the removed PHT entry since the PHT entry becomes invalid as a result of the write I/O to update content stored at LA.

The techniques herein can be performed by any suitable hardware and/or software. For example, techniques herein can be performed by executing code which is stored on any one or more different forms of computer-readable media, where the code can be executed by one or more processors, for example, such as processors of a computer or other system, an ASIC (application specific integrated circuit), and the like. Computer-readable media can include different forms of volatile (e.g., RAM) and non-volatile (e.g., ROM, flash memory, magnetic or optical disks, or tape) storage which can be removable or non-removable.

While the techniques of the present disclosure have been presented in connection with embodiments shown and described in detail herein, their modifications and improvements thereon will become readily apparent to those skilled in the art. Accordingly, the spirit and scope of the techniques of the present disclosure should be limited only by the following claims.

What is claimed is:

1. A computer-implemented method comprising:
   receiving, at a first node of a system, a read I/O to read content C1 stored at a target logical address LA, wherein the first node does not own LA and wherein a second node of the system owns LA;
   determining whether a first hash table of the first node includes a first matching entry for LA; and
   responsive to determining the first hash table of the first node does not include the first matching entry for LA, performing first processing including:
   sending a first request from the first node to the second node that owns LA, wherein the first request requests the second node to perform resolution processing for LA;
   responsive to receiving the first request, the second node sending a first response to the first node, the first response including a first address hint corresponding to LA, and wherein the first response includes one or more additional address hints corresponding to one or more logical addresses, wherein LA and the one or more logical addresses are included in a first logical address subrange associated with a single metadata (MD) page used in mapping LA and the one or more logical addresses to corresponding physical storage locations that store content of LA and the one or more logical addresses; responsive to the first node receiving the first response, the first node adding one or more entries to the first hash table for the one or more additional address hints that are included in the first response and that correspond to the one or more logical addresses; and obtaining, by the first node using the first address hint of the first response, C1 from a first physical storage location.

2. The computer-implemented method of claim 1, wherein the first processing includes the first node returning C1 as obtained from the first physical storage location using the first address hint of the response.

3. The computer-implemented method of claim 1, wherein the first hash table is a prefetch hash table of entries for logical addresses not owned by the first node, wherein each entry of the first hash table includes a prefetched address hint and a corresponding logical address, wherein the prefetched address hint is used to access current content of the corresponding logical address and where the current content is stored at a physical location storage location on backend non-volatile storage.

4. The computer-implemented method of claim 1, further comprising:
responsive to determining the first hash table of the first node includes the first matching entry for LA, the first node performing second processing, wherein the first matching entry for LA includes the first address hint for LA, and wherein the second processing includes the first node using the first address hint to read C1 from the first physical storage location on backend non-volatile storage.

5. The computer-implemented method of claim 4, wherein the second processing includes the first node returning C1 as read from the first physical location in response to the read I/O.

6. The computer implemented method of claim 1, wherein the first address hint and the one or more additional address hints are indirect pointers used to obtain corresponding content of corresponding logical addresses from corresponding physical storage locations.

7. The computer-implemented method of claim 6, wherein first mapping information is used in mapping the LA to the first physical storage location storing C1, and wherein the first mapping information includes a MD top object, a MD mid object and a MD leaf object associated with LA.

8. The computer-implemented method of claim 7, wherein each of the indirect pointers associated with a corresponding logical address is an address of, or pointer to, a virtual layer block (VLB) entry, wherein the VLB entry includes an address of, or pointer to, a corresponding physical storage location of content stored at the corresponding logical address.

9. The computer-implemented method of claim 7, wherein LA and the one or more logical addresses are included in a logical address range R1 associated with the MD leaf object.

10. The computer-implemented method of claim 7, wherein LA and the one or more logical addresses form a consecutive sequential logical address subrange.

11. The computer-implemented method of claim 10, wherein each of the one or more logical addresses is subsequent to LA in the consecutive sequential logical address subrange.

12. The computer implemented method of claim 1, wherein the first address hint and the one or more additional address hints are first addresses or pointers used to obtain corresponding content of corresponding logical addresses from corresponding physical storage locations.

13. The computer-implemented method of claim 12, wherein first mapping information is used in mapping the LA to the first physical storage location storing C1, and wherein the first mapping information includes a MD top object, a MD mid object and a MD leaf object associated with LA.

14. The computer-implemented method of claim 13, wherein each of the first addresses or pointers associated with a corresponding logical address is an address of, or pointer to, a corresponding physical storage location of content stored at the corresponding logical address.

15. The computer-implemented method of claim 14, wherein LA and the one or more logical addresses are included in a logical address range R1 associated with the MD leaf object.

16. The computer-implemented method of claim 1, further comprising:
receiving, by the second node that owns LA, a write I/O that writes second content C2 to LA;
responsive to the second node receiving the write I/O directed to LA, sending a notification to the first node that does not own LA;
responsive to the first node receiving the notification, the first node removing any corresponding entry from the first hash table that matches LA; and
recording the write I/O in a log file.

17. The computer-implemented method of claim 1, further comprising:
receiving, by the first node that does not own LA, a write I/O that writes second content C2 to LA;
responsive to the first node receiving the write I/O directed to LA, the first node removing any corresponding entry from the first hash table that matches LA; and
recording the write I/O in a log file.

18. The computer-implemented method of claim 1, wherein the LA and the one or more logical addresses are owned by the second node, and wherein the second node owns all logical addresses associated with the single MD page.

19. One or more non-transitory computer readable media comprising code stored thereon that, when executed, performs a method comprising:
receiving, at a first node of a system, a read I/O to read content C1 stored at a target logical address LA, wherein the first node does not own LA and wherein a second node of the system owns LA;
determining whether a first hash table of the first node includes a first matching entry for LA; and
responsive to determining the first hash table of the first node does not include the first matching entry for LA, performing first processing including:
sending a first request from the first node to the second node that owns LA, wherein the first request requests the second node to perform resolution processing for LA;

responsive to receiving the first request, the second node sending a first response to the first node, the first response including a first address hint corresponding to LA, and wherein the first response includes one or more additional address hints corresponding to one or more logical addresses, wherein LA and the one or more logical addresses are included in a first logical address subrange associated with a single metadata (MD) page used in mapping LA and the one or more logical addresses to corresponding physical storage locations that store content of LA and the one or more logical addresses;

responsive to the first node receiving the first response, the first node adding one or more entries to the first hash table for the one or more additional address hints that are included in the first response and that correspond to the one or more logical addresses; and obtaining, by the first node using the first address hint of the first response, C1 from a first physical storage location.

20. A system comprising:

one or more processors; and one or more memories comprising code stored thereon that, when executed, performs a method comprising:

receiving, at a first node of a system, a read I/O to read content C1 stored at a target logical address LA, wherein the first node does not own LA and wherein a second node of the system owns LA;

determining whether a first hash table of the first node includes a first matching entry for LA; and responsive to determining the first hash table of the first node does not include the first matching entry for LA, performing first processing including:

sending a first request from the first node to the second node that owns LA, wherein the first request requests the second node to perform resolution processing for LA;

responsive to receiving the first request, the second node sending a first response to the first node, the first response including a first address hint corresponding to LA, and wherein the first response includes one or more additional address hints corresponding to one or more logical addresses, wherein LA and the one or more logical addresses are included in a first logical address subrange associated with a single metadata (MD) page used in mapping LA and the one or more logical addresses to corresponding physical storage locations that store content of LA and the one or more logical addresses;

responsive to the first node receiving the first response, the first node adding one or more entries to the first hash table for the one or more additional address hints that are included in the first response and that correspond to the one or more logical addresses; and obtaining, by the first node using the first address hint of the first response, C1 from a first physical storage location.

\* \* \* \* \*